United States Patent [19]
Buchanan et al.

[11] Patent Number: 5,475,727
[45] Date of Patent: Dec. 12, 1995

[54] INTELLIGENT AUTOMATIC GAIN STABILIZATION FOR RADIATION DETECTION INSTRUMENT

[75] Inventors: Ronnie J. Buchanan; Gilbert H. Forehand; Timothy D. Rice, Duncan, all of Okla.

[73] Assignee: Halliburton Company, Duncan, Okla.

[21] Appl. No.: 90,446

[22] Filed: Jul. 9, 1993

[51] Int. Cl.[6] .................................................. G01N 23/06
[52] U.S. Cl. ............................... 378/53; 378/83; 364/498
[58] Field of Search ...................... 364/497, 498; 395/911, 928, 929; 378/53, 82, 83, 88; 250/390.04, 390.07

[56] References Cited

U.S. PATENT DOCUMENTS

| | | | |
|---|---|---|---|
| 3,797,300 | 3/1974 | Sato | 73/23.23 |
| 3,976,878 | 8/1976 | Chevalier et al. | 250/253 |
| 4,047,029 | 9/1977 | Allport | 378/90 |
| 4,433,240 | 2/1984 | Seeman | 250/256 |
| 4,583,187 | 4/1986 | Stoub | 364/571 |
| 5,023,449 | 6/1991 | Holenka et al. | 250/252.1 |
| 5,180,917 | 1/1993 | Wraight | 250/374 |

OTHER PUBLICATIONS

Price, W. J., "Nuclear Radiation Detection," 2nd ed. New York: McGraw—Hill, pp. 202–203. (1964).
Tsoulfanidis, N., "Measurement and Detection of Radiation," New York: McGraw—Hill, pp. 140–150 (1983).
Canberra Industries, Inc. "Instruction manual: Spectrum Stabilizer Model 2050," (1983f).

*Primary Examiner*—David P. Porta
*Assistant Examiner*—David Vernon Bruce
*Attorney, Agent, or Firm*—Stephen R. Christian; E. Harrison Gilbert, III

[57] ABSTRACT

An intelligent automatic gain stabilization method and apparatus for a radiation detection instrument automatically locate the position of a predetermined characteristic within an energy spectrum, automatically determine whether the characteristic is properly located, and automatically provide gain adjustment to the output of the radiation detection instrument to maintain measurement accuracy of the system.

22 Claims, 12 Drawing Sheets

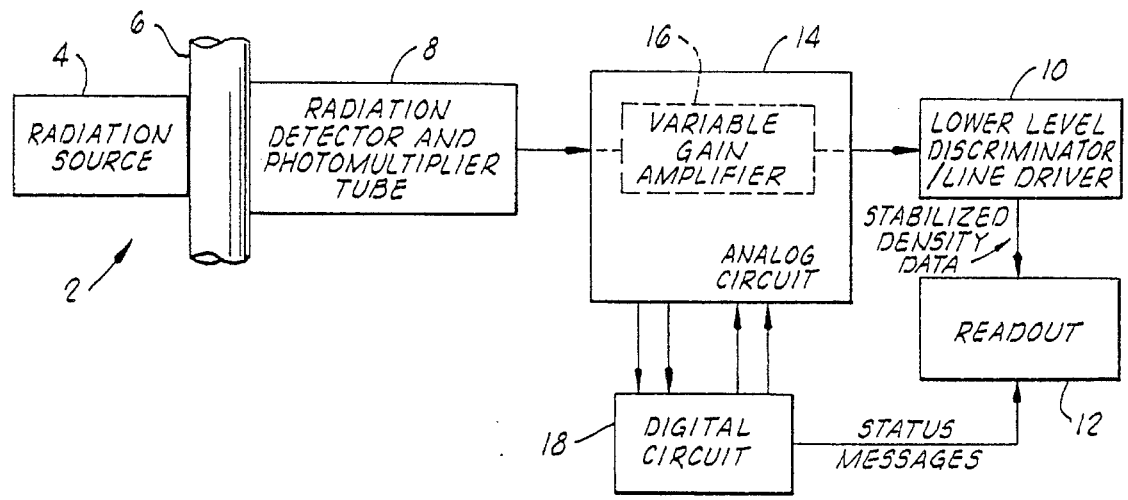
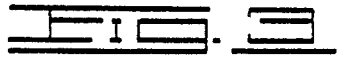
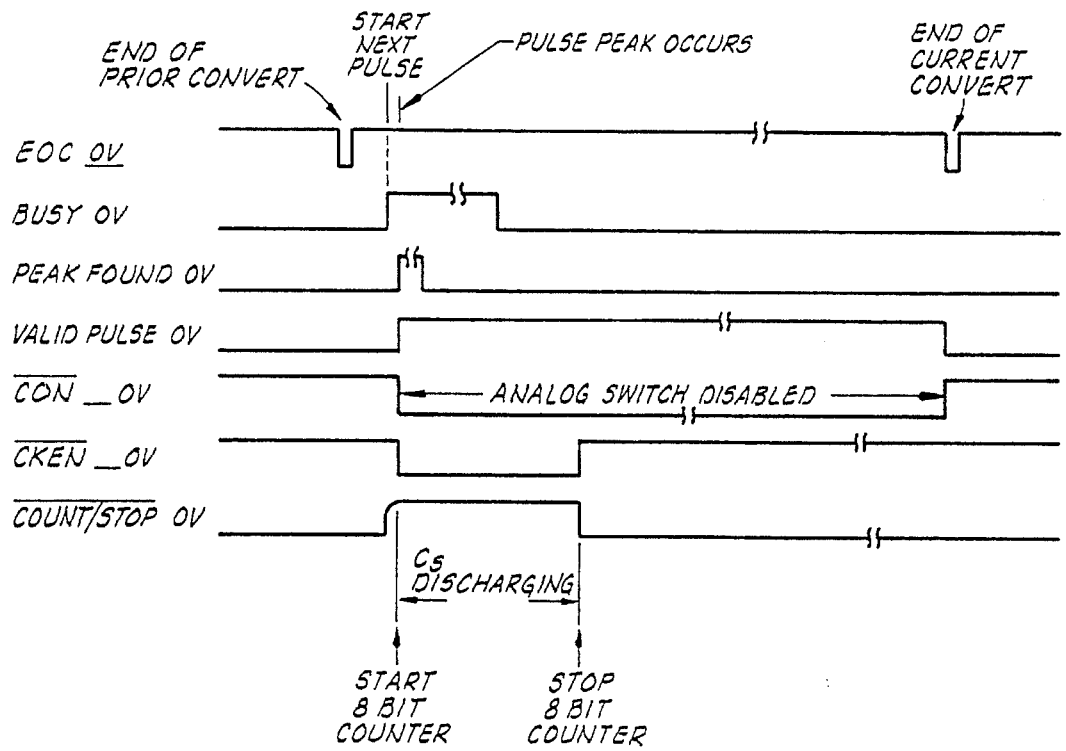
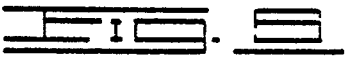

INTELLIGENT AUTOMATIC GAIN STABILIZATION FOR RADIATION DETECTION INSTRUMENT

BACKGROUND OF THE INVENTION

This invention relates generally to a method and apparatus for stabilizing the output of a radiation detection instrument. A particular aspect of the present invention is its ability to automatically stabilize the output of the radiation detection instrument by responding to a predetermined energy level that is sensed by the instrument due to a known type of radiation interaction event that occurs in the radiation detector assembly of the instrument.

Many instrumentation processes utilize radiation interactions as a method of measurement. The reliability of these instruments depends to a great extent on the stability of the instrument in converting a radiation interaction event in the radiation detector assembly into an electric signal to be analyzed for a given purpose. It is typically desirable that the amplitude of each electric signal precisely represent the respective amount of energy deposited by each corresponding radiation interaction event that takes place in the detector. If this representation is stable, then the instrument will function well under a variety of conditions. If it is unstable, however, the measurement performed by the instrument will not be reliable.

One type of radiation interaction used to make measurements is gamma ray attenuation. When gamma rays pass through a medium they can interact by photoelectric absorption, Compton scattering, or pair production. The composition of the medium and the energy of the gammas determine which of these reactions are possible, and which are prevalent.

When a photoelectric absorption event occurs, all the energy of the gamma is imparted to an inner orbital electron of an atom in the absorbing medium. The gamma disappears and an electron is ejected from its orbit. The ejected electron creates excitation and ionization in the absorber. The photoelectric reaction is most predominant at low gamma-ray energies (E) and in high atomic number (Z) materials. The photoelectric coefficient, tau, is approximately proportional to $E^{-3}$ and $Z^4$.

When a gamma undergoes Compton scattering, it only imparts part of its energy to an outer orbital electron, the rest of its energy is carried off by a degraded gamma, which may undergo additional Compton scattering or photoelectric interactions. The ejected electron creates excitation and ionization in the absorber. Compton scattering is predominant at medium gamma-ray energies and is nearly independent of the atomic number of the absorbing medium, except at high Z values. The Compton coefficient, sigma, is proportional to approximately $1/E$.

If a gamma ray contains an energy of greater than 1.02 mega-electron-volts (MeV), it can undergo pair production. This consists of a gamma ray passing in close proximity of the short range nuclear forces of an atom and its energy being converted to mass, according to the equation $E=MC^2$. In this case, two particles, an electron and a positron, are created and the gamma disappears. The electron and positron cause excitation and ionization in the medium. The pair production coefficient, kappa, has a threshold at 1.02 MeV and is approximately proportional to the natural logarithm of E (ln E) and $Z^2$.

An example of an instrument that utilizes gamma-ray detection is a radioactive densimeter. This instrument is used, for example, in a fluid line to measure the density of the substance flowing through the line. The radioactive densimeter is used extensively in the chemical and petroleum industries for this purpose. A typical radioactive densimeter used in oil well servicing to measure the density of cement slurries includes an encapsulated gamma ray emitting source mounted in a shield on one side of a pipe and a radiation detector assembly mounted on the opposite side of the pipe. The radioactive densimeter operates on the principle that the more dense the fluid is, the more the radiation from the source will be absorbed by the fluid whereby less radiation will reach the detector, which will result in a decreased radiation interaction rate in the detector.

A specific type of radioactive densimeter utilizes cesium-137 (Cs-137), with a gamma-ray energy of 662 kilo-electron-volts (keV), as a source; and it uses a thallium-doped sodium iodide (NaI) scintillator, with an effective atomic number of 32, coupled to a photomultiplier tube as a detector assembly. With this particular instrument, approximately 10% of the total counts registered by the unit are due to photoelectric absorption of the primary gamma ray in the scintillator, approximately 90% are due to Compton scattering events, and no pair production events occur because the gamma-ray energy is below 1.02 MeV. Cesium-137 decays by emitting a monoenergetic gamma ray, 662 keV. When a photoelectric event occurs in the scintillator, it always absorbs all of this energy and deposits an unique amount of energy, 662 keV, in the scintillator to be converted to ultraviolet light. The photomultiplier tube collects the ultraviolet light and creates an electrical pulse proportional to the intensity of the ultraviolet light.

FIG. 1 shows a typical gamma-ray energy spectrum obtained from a NaI detector exposed to Cs-137 radiation. Notice that the full energy photopeak of 662 keV (i.e., the collection of photoelectric events) has a Gaussian distribution. This distribution is due mainly to the statistical variations that occur in the number of electron-volts required to create each ion pair in the scintillator and the efficiency of converting the energy of an ion pair to ultraviolet light.

This instrument works well as long as the electric pulse output of the radiation detector assembly is a true function of the radiation energy deposited in the NaI detector for each individual radiation interaction event occurring in the detector. This is of critical importance because most gamma-ray detecting instruments, such as the aforementioned radioactive densimeter, process the electric signal by utilizing a set lower level discriminator that allows all electric pulses above the set level to pass and be counted and all electric pulses below the set level to be rejected. The pulses that are passed are counted and the resultant density determination is a function of this count rate. If the output pulse of the detector assembly is not a constant function of the energy deposited by the radiation event in the NaI detector, then the number of pulses per unit time that pass the lower level discriminator and are counted will not be truly representative of the characteristic being measured (e.g., density of the fluid in the pipe). The output of the radiation detector assembly can be adversely affected by temperature changes, photomultiplier tube supply voltage drift, photomultiplier tube-to-NaI detector coupling changes and other faults that affect the radiation detector assembly output pulse height, producing erroneous density readings. Therefore, a method is needed to ensure that the electric pulse output of the radiation detector assembly is a known function of the radiation energy deposited in the NaI detector for each individual radiation interaction event. This method typically provides an error-correcting stabilization function between the radiation detector assembly output and the lower level discriminator.

Gain stabilization (or, more precisely, spectrum stabilization via stabilizing amplifier gain adjustments) has been used successfully in laboratory instruments for a number of years and commercial units are available to perform that function. However, in instruments used outside the laboratory environment, such as the radioactive densimeter in field use, this stabilization has not been feasible because the operator would have to interact with the stabilizing function and provide input to the system. This interaction requires training, time, and extra hardware and is not practical in most field applications.

A common method used for spectrum stabilization in the laboratory includes analyzing the count rates that occur in two windows, of equal width, placed equal distance on opposite sides of the photopeak centroid, as shown in FIG. 2. The counts are collected by means of two identical single-channel analyzers (SCA): one single-channel analyzer is set on the lower window, and the other single-channel analyzer is set on the upper window. The count rates from the two single-channel analyzers are analyzed by a processing unit which controls a variable gain amplifier. If the photopeak centroid is located at an equal distance between the two windows, then the two windows will lie on oppositely symmetrical portions of the photopeak. This will result in the two single-channel analyzers registering the same count rates, within normal statistical variations, and the processing unit setting the variable gain amplifier to unity gain; hence no correction is made. However, if for any reason, such as temperature change, high voltage or electronic drift, changes in couplings, etc., the position of the photopeak were to change, the count rates in the two single-channel analyzers would become unbalanced. This would result in a correction being made, in the appropriate direction, in the variable gain amplifier to bring the photopeak back to the center position between the windows. For example, if the amplitude of the incoming pulses started to decrease, the lower window would register more counts than the upper window; the processing unit would then increase the gain of the variable amplifier until the count rates of the two single-channel analyzers were equal. If the amplitude increased, the opposite sequence would take place.

Although the foregoing stabilization technique is known, it does not automatically first find the relevant peak in the spectrum and therefore does not provide fully automatic stabilization. Thus, there is the need for a stabilization method and apparatus that can also automatically locate a relevant feature of an energy spectrum and then automatically adjust the located feature to produce stabilized spectra. This should be done automatically, without operator input, and without error. This requires an intelligent system that can locate the relevant feature in the energy spectrum, determine its present position, calculate the needed correction factor, adjust the gain, and then continuously check the energy spectrum to ascertain that the feature is in the correct position. This should be automatically initiated when power is applied, and continued indefinitely, without locking on the wrong feature or requiring any input from the operator.

SUMMARY OF THE INVENTION

The present invention overcomes the above-noted and other shortcomings of the prior art and meets the aforementioned needs by providing a novel and improved method and apparatus for stabilizing the output of a radiation detection instrument. Advantages of the present invention include its ability to stabilize the output of radiation detection instruments, its ability to do so automatically, its ability to locate one or more relevant features of a spectrum by which stabilization is to be determined, its ability to make coarse or fine adjustments depending upon where the relevant feature or features are found within the spectrum, and its ability to continuously maintain stability throughout extended instrument use periods.

In obtaining these advantages, the present invention provides a method of stabilizing the output of a radiation detection instrument to provide consistent energy spectra with a predetermined peak at a predetermined energy level (such as the aforementioned 662 keV Cs-137 photopeak) within the spectra. This method comprises: collecting an energy spectrum using the radiation detection instrument; testing the collected spectrum against a predetermined rule set to determine automatically both where the predetermined peak is in the collected spectrum and whether the located predetermined peak is at the predetermined energy level in the collected spectrum; and adjusting the output of the radiation detection instrument, in response to testing the collected spectrum, so that the predetermined peak of at least a subsequently collected spectrum is at the predetermined energy level within the subsequently collected spectrum. The step of testing is performed in a preferred embodiment by analyzing the spectrum relative to three criteria, wherein the first criterion distinguishes relative maxima within the spectrum and the second criterion distinguishes relative positioning of a maximum within the spectrum. The third criterion distinguishes whether the predetermined peak is inside or outside a predetermined range of the predetermined energy level of the spectrum.

Stated another way, the present invention provides a method of stabilizing the output of a radiation detection instrument to provide output electric pulses consistently representing respective radiation energies deposited in a detector of the instrument for respective individual radiation interaction events, which method comprises: (a) automatically determining which of a sample of the output electric pulses are to represent a predetermined radiation energy and determining whether these output electric pulses actually designate the predetermined radiation energy; and (b) automatically adjusting the output of the radiation detection instrument in response to determining that the sampled output electric pulses that are to represent the predetermined radiation energy do not designate the predetermined radiation energy.

In a particular implementation step (a) includes: (a1) converting respective sampled electric pulses to respective counts; (a2) generating respective digital counts of the numbers of counts from step (a1) having the same values and storing each digital count as a respective identifiable bin in a computer memory; (a3) determining whether the predetermined radiation energy could be represented by a digital count within a selected group of the bins, including computing a sum of the digital counts in the selected group of bins and computing a sum of the digital counts for a plurality of groups of the bins; and (a4) for a selected group of bins determined in step (a3) to be a candidate group by including a digital count that could represent the predetermined radiation energy, determining whether the candidate group actually includes the digital count that represents the predetermined radiation energy, including comparing a sum of the digital counts from the bins in the candidate group to a sum of the digital counts from the bins in another selected group of bins. Step (a) can further include, for a candidate group determined in step (a4) to be the correct candidate group by including the digital count that represents the predetermined radiation energy, determining whether the correct candidate group includes as one of its bins a bin that has been predetermined as the proper bin for containing the digital count representing the predetermined radiation energy.

In the aforementioned particular implementation step (b) includes: in response to determining that the correct candidate group does not include the bin predetermined as the proper bin, generating a coarse adjustment signal and communicating the coarse adjustment signal to a variable gain amplifier receiving the output of a radiation detector assembly of the radiation detection instrument; and in response to determining that the correct candidate group does include the bin predetermined as the proper bin, determining a centroid in response to the digital counts in the bins of the correct candidate group, generating a fine adjustment signal in response to the centroid and communicating the fine adjustment signal to the variable gain amplifier.

The present invention also provides an apparatus for stabilizing the output of a radiation detection instrument which includes a radiation detector assembly. The apparatus comprises: a variable gain amplifier for receiving output from the radiation detector assembly; and a programmed digital computer for receiving input responsive to output from the radiation detector assembly and for providing adjustment control to the variable gain amplifier. The programmed computer includes: means for defining storage bins in the computer; means for defining one of the storage bins as a predetermined bin where data representing a predetermined radiation interaction event energy sensed by the radiation detector assembly should be stored; means for generating respective data in response to output from the radiation detector assembly and for storing the generated data in respective bins; means for analyzing selected groups of bins for determining which group of bins includes a bin containing data representing the predetermined radiation interaction event energy and for determining whether such determined group includes the predetermined bin; means for generating a coarse adjustment signal for controlling the variable gain amplifier in response to the means for analyzing determining such determined group does not include the predetermined bin; and means for generating a fine adjustment signal for controlling the variable gain amplifier in response to the means for analyzing determining such determined group does include the predetermined bin.

Therefore, from the foregoing, it is a general object of the present invention to provide a novel and improved method and apparatus for stabilizing the output of a radiation detection instrument. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 3 is a block diagram of a system utilizing the present invention.

FIG. 5 shows analog control signal timing for the FIG. 4 circuit.

DETAILED DESCRIPTION OF PREFERRED EMBODIMENT

Figure 1:
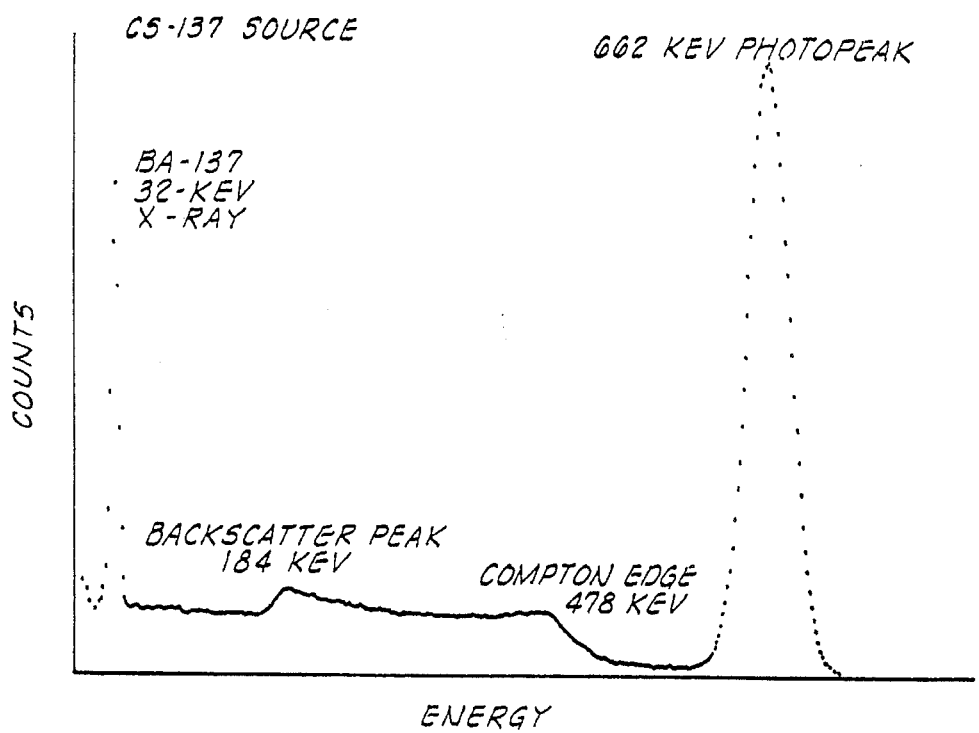
FIG. 1 illustrates a gamma-ray energy spectrum.
Figure 2:
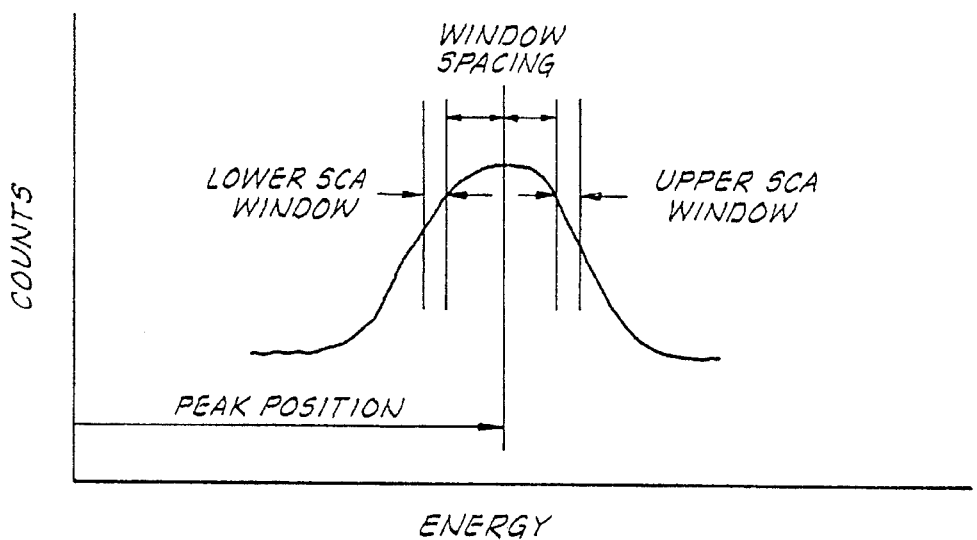
FIG. 2 illustrates a prior art correction technique.

A particular implementation of the present invention will be described with reference to a radioactive densimeter and gamma-ray radiation; however, this is not to be taken as limiting the present invention. That is, in general the present invention can be used for any radiation detection instrument that employs an energy spectrum to provide measurement information. The instrument can be for laboratory, portable, field or other use, and the energy spectrum can be the result of alpha, x-ray, gamma, neutron, or proton radiation interaction, for example.

An overall system that includes both conventional equipment and the apparatus of the present invention is represented in FIG. 3. A radioactive densimeter 2 defining a particular radiation detection instrument comprises a cesium-137 source with associated shielding 4 mounted on a flow line 6. Included in the radioactive densimeter 2 and mounted opposite the source 4 is a sodium iodide scintillation crystal and photomultiplier tube detector assembly 8. The output from the radioactive densimeter 2, as specifically provided from the detector assembly 8, is provided to a conventional lower level discriminator 10 after the output is stabilized by the present invention as subsequently described. In the particular implementation, the lower level discriminator 10 is housed in the shielding that also houses the detector assembly 8 of the radioactive densimeter 2. An external readout device 12 displays the count rate or density taken as a result of electric pulses having levels exceeding the lower level discriminator 10. The radioactive densimeter 2, the lower level discriminator 10 and the readout 12 are conventional devices known in the art.

The apparatus of the present invention depicted in FIG. 3 is implemented through an analog circuit 14 that includes a variable gain amplifier 16 connected functionally between the photomultiplier tube of the detector assembly 8 and the lower level discriminator 10; and through a digital circuit 18 communicating with (1) the analog circuit 14 to receive spectral data and provide timing and control signals, (2) the variable gain amplifier 16 to provide a gain control signal thereto, and (3) the readout device 12 to display operation status messages therethrough. In the particular implementation, the analog circuit 14 and the digital circuit 18 are mounted with the lower level discriminator 10 in the shielding of the radioactive densimeter 2 to facilitate communication of the output from the detector assembly 8 to the apparatus of the present invention.

The analog circuit 14 processes the electric pulses received from the radioactive densimeter 2. It converts the raw pulse output of the detector assembly 8 into a form which can be appropriately handled by the digital circuit 18. The analog circuit 14 also receives the computed gain feedback from the digital circuit 18 and adjusts the gain of the system as needed. Several timing and control signals are passed between the analog and digital circuits to ensure that data integrity is maintained.

The digital portion provides the "intelligent" gain control feature. The digital circuit 18 receives input pulses from the analog circuit 14, for a given time duration, and during this period a statistical sample of the spectrum is formed in a digital memory of a digital controller in the digital circuit 18. Having obtained spectral data, mathematical operations are then carried out by the controller to locate the photopeak in the gamma-ray energy spectrum, determine the peak centroid, and calculate the required gain adjustment. The cycle of spectral data acquisition and calculation is continually repeated. Status signals are provided so that an operator can monitor the system.

The present invention constantly monitors the gamma-ray energy spectrum, noting the photopeak location. If it determines that there has been a change for any reason, the present invention attempts to compensate by adjusting the variable gain amplifier 16, which applies the gain change to the entire gamma-ray energy spectrum. This gain change shifts the photopeak back to the appropriate position so that the total count rate (the sum of the counts above the setting of the lower level discriminator 10) is what it would have been had there been no shift in the output from the radioactive densimeter 2 in the first place. The adjustment is completely transparent to the operator.

Analog Circuit 4

The analog section 14 of the particular implementation has the following primary purposes:

1. It processes the electrical pulses from the photomultiplier tube, captures and holds pulse peaks, performs timed constant-current discharging on them and passes the information to the digital section.

2. It converts the digitally computed throughput gain to a voltage which is used to control the variable gain amplifier 16.

Figure 10A:
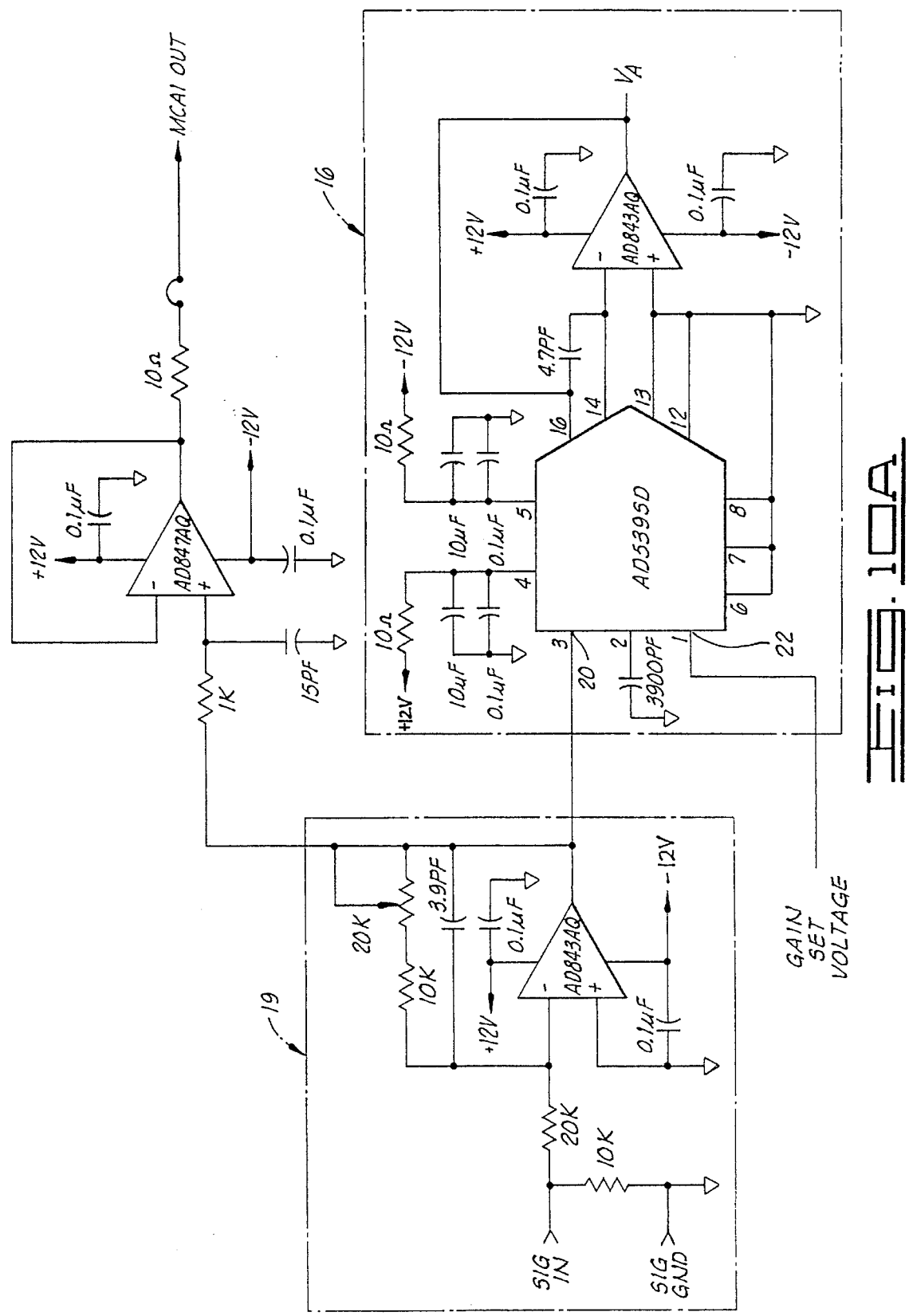
FIGS. 10A–10F are schematic circuit diagrams of a particular implementation of the analog circuit represented in FIG. 4 and of a lower level discriminator circuit.
Figure 10B:
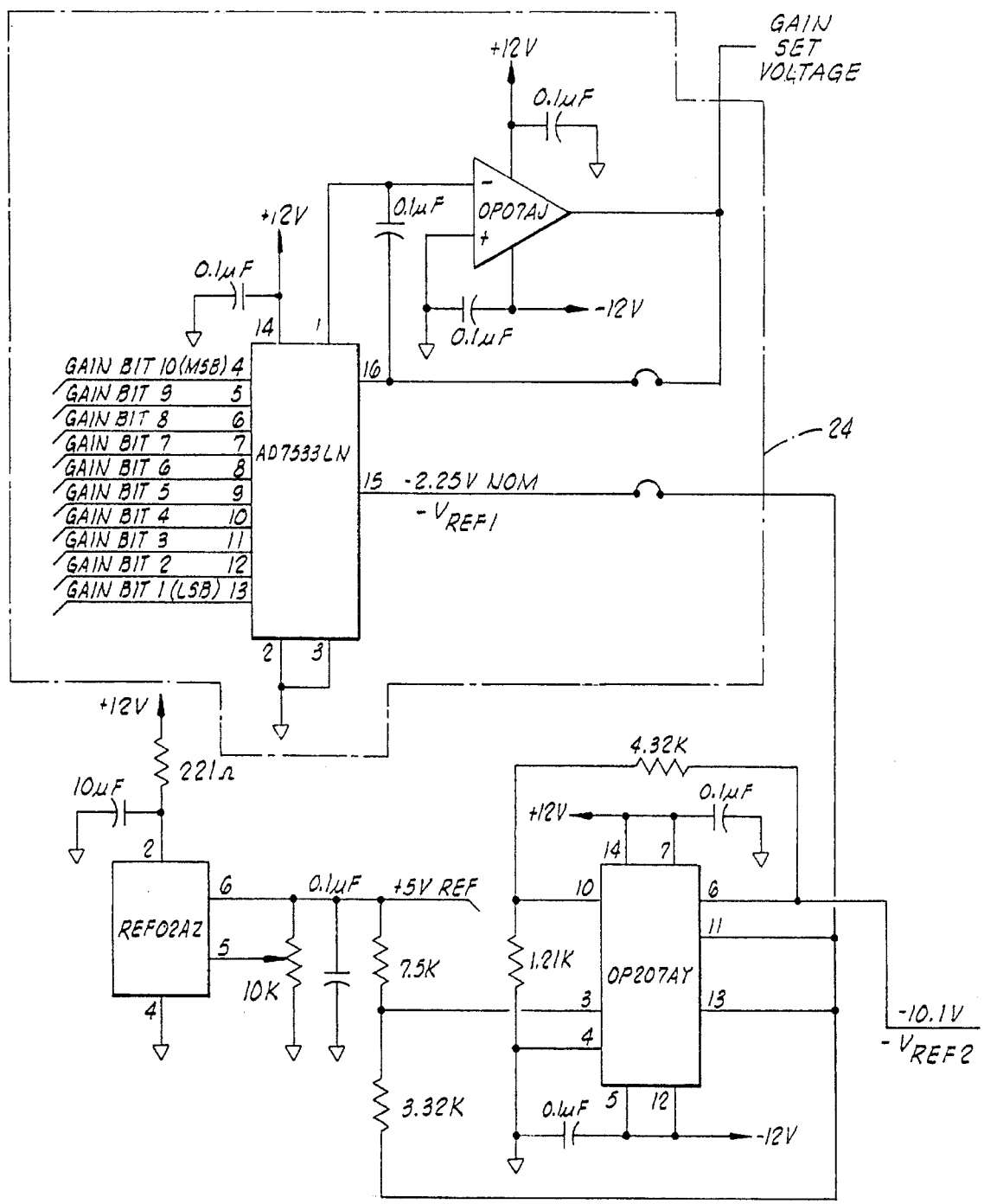
Figure 10C:
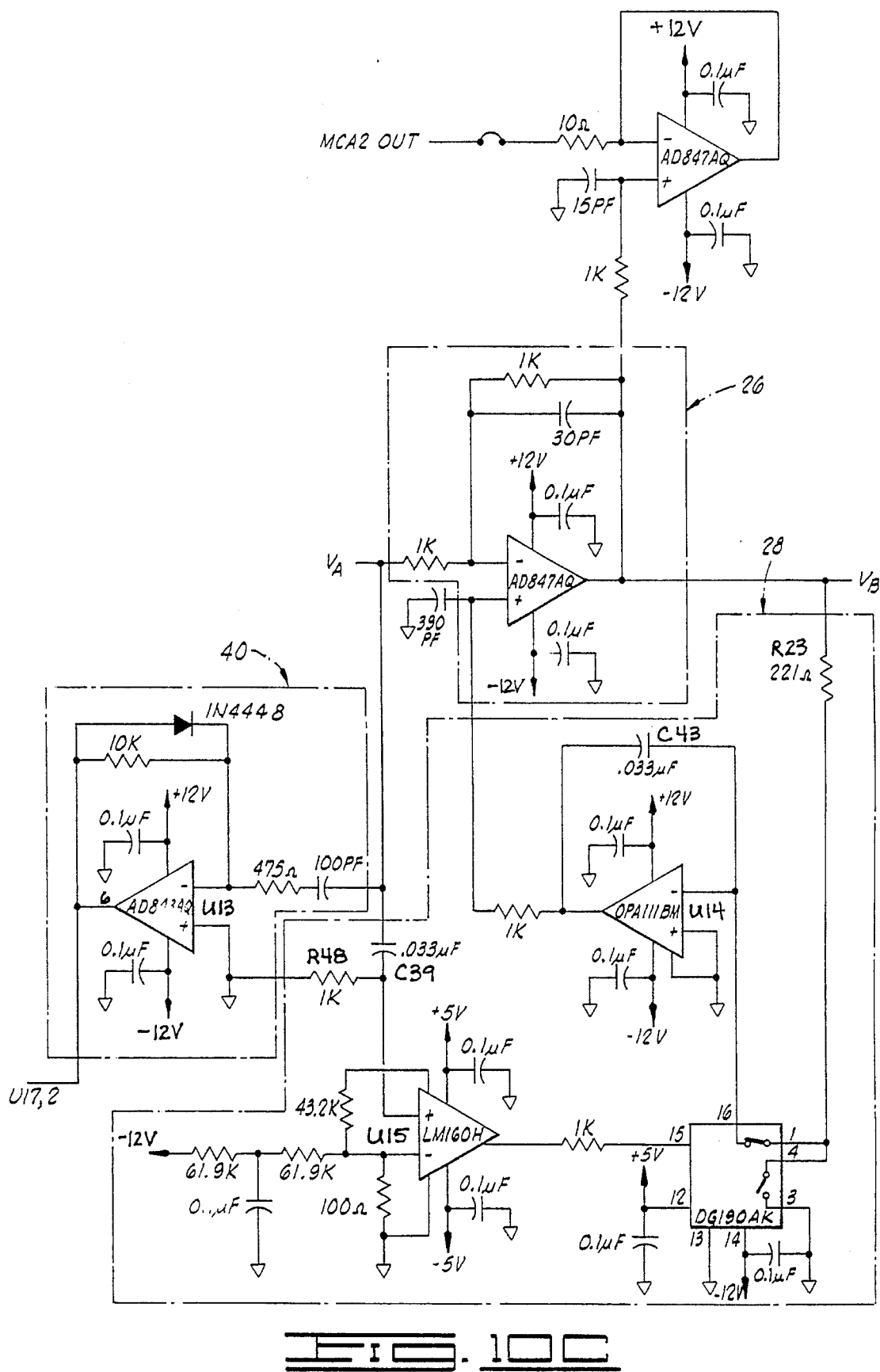
Figure 10:
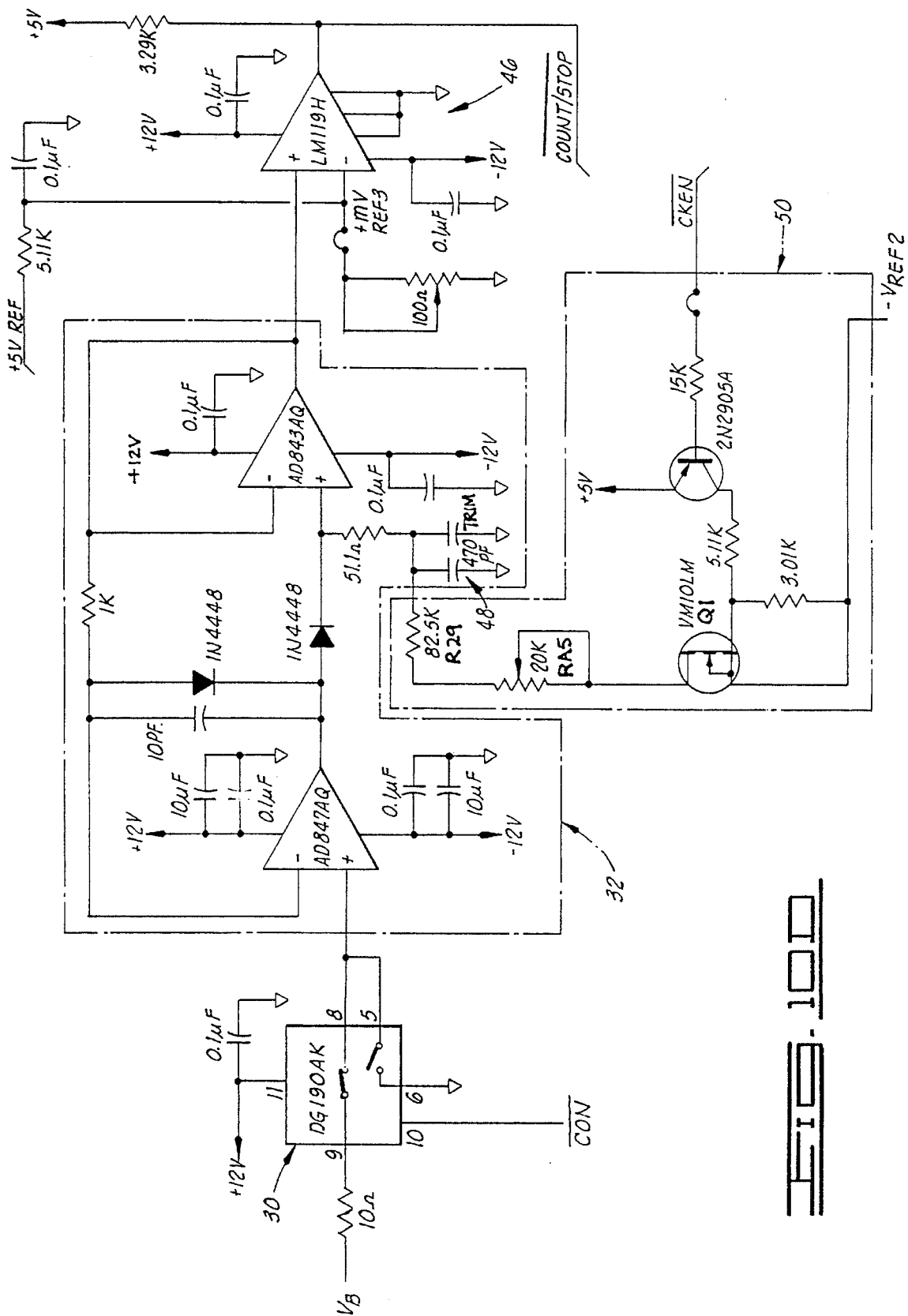
Figure 10E:
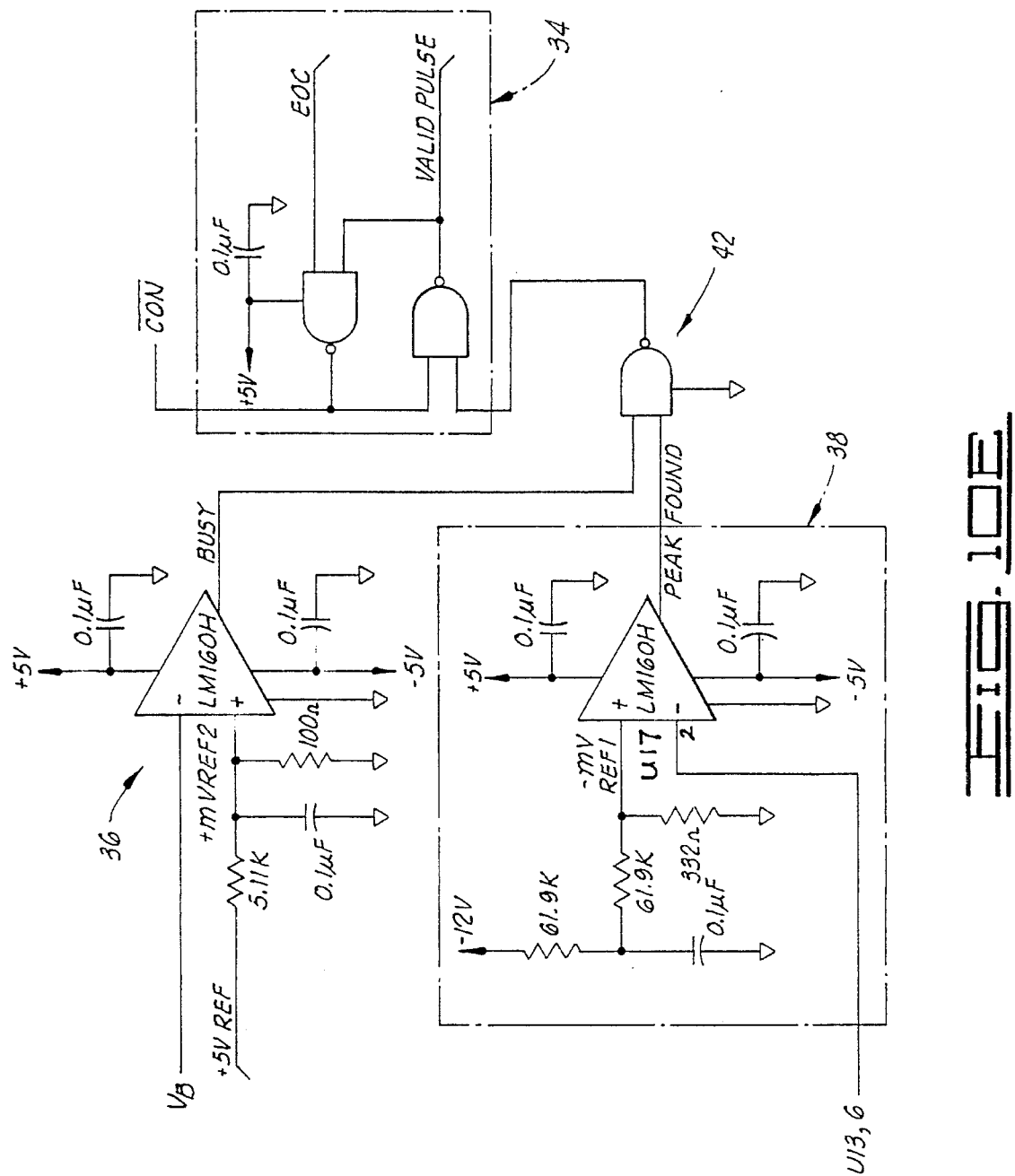
Figure 10F:
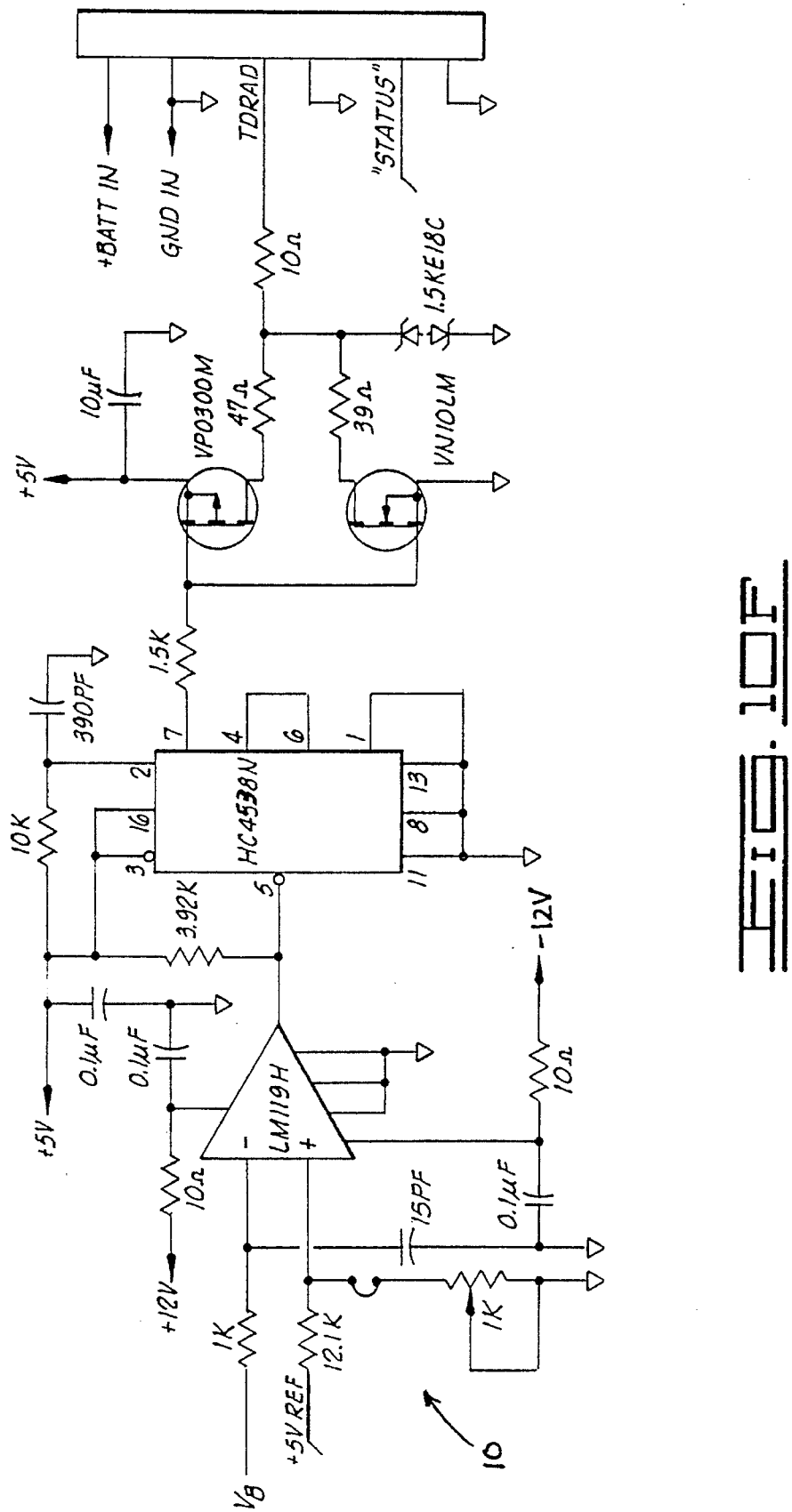

The analog circuit 14 of the preferred embodiment will be described with reference to FIG. 4; however, a particular implementation thereof is shown in FIGS. 10A–10E (a particular implementation of the lower level discriminator 10 and related circuitry is shown in FIG. 10F).

Figure 4:
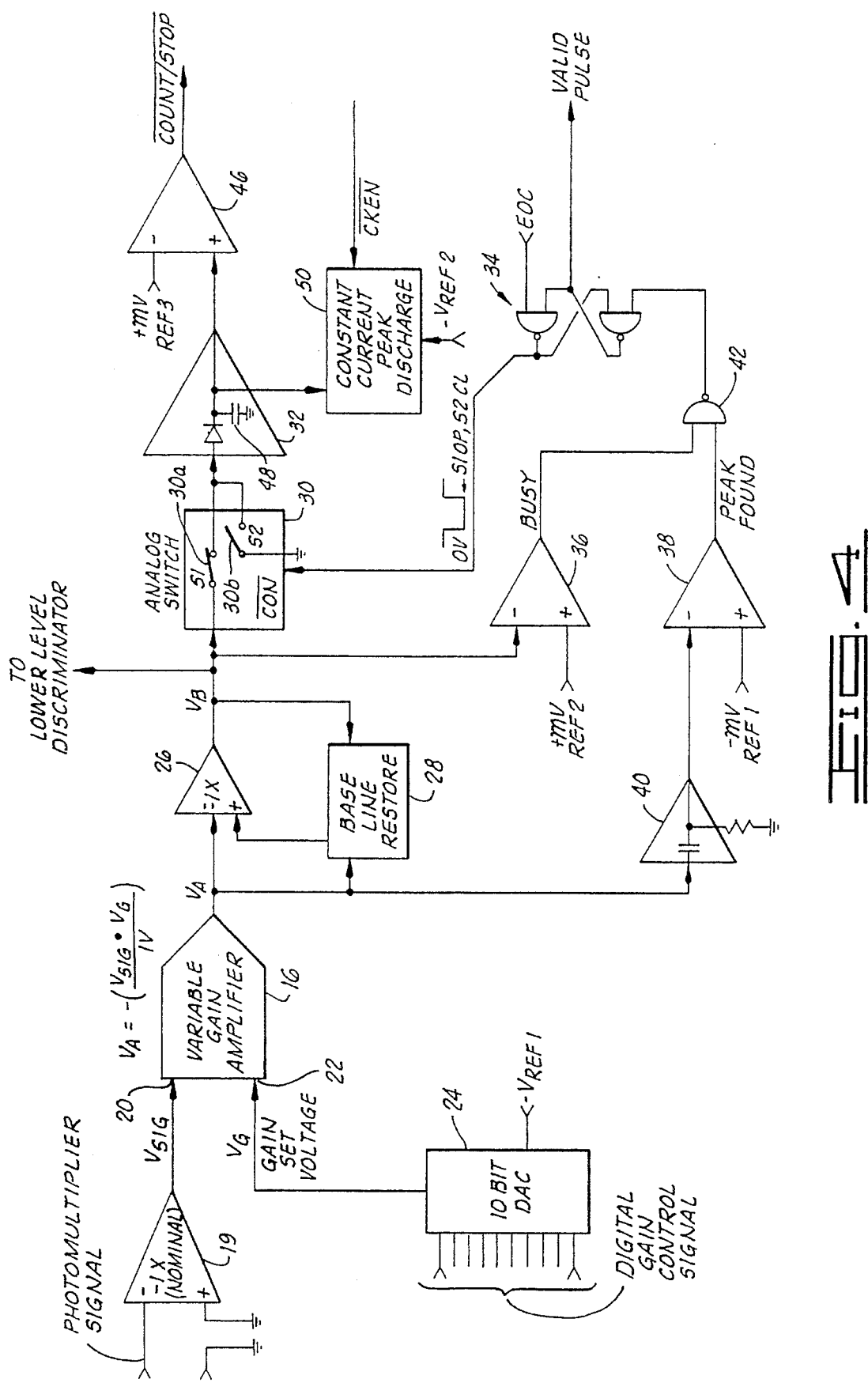
FIG. 4 is a schematic circuit diagram of an analog circuit for implementing the present invention.

Referring to FIG. 4, an amplifier 19 receives the negative going pulses from the photomultiplier tube. The amplifier 19 has a nominal gain of −1X but is adjustable from about −0.5X to −1.5X to initially account for photomultiplier tube gain variation. The amplifier's output, Vsig, is sent to an input 20 of the variable gain amplifier 16. A D.C. control voltage, Vg, that sets the gain of the variable gain amplifier 16 is provided to an input 22 thereof. Vg comes from a 10-bit digital to analog converter (DAC) 24 whose input is a digital gain control signal from the digital circuit 18. Vg can range from about +0.45VDC to +2.1VDC, varying the gain applied to Vsig by that same factor.

A variable gain amplifier output signal $V_A$ is processed by an amplifier 26 with a gain of −1X. The output offset of this amplifier is held to zero volts by a base line restoration circuit 28. The amplitude of each pulse peak from zero volts is critical in establishing a gamma-ray energy spectrum. Each pulse must be referenced to zero volts in order to be processed correctly by the Lower Level Discriminator (LLD) for accurate density calculation. Thus, the circuit 28 monitors the input and output of amplifier 26 and ensures that any baseline offset errors, regardless of source, are removed from $V_B$ pulses before further processing. A particular implementation of the base line restoration circuit 28 is shown in FIG. 10C, wherein an integrator circuit (R23, C43 and U14) holds $V_B$ at zero volts until the leading edge of a negative-going pulse appears at $V_A$ and is differentiated by C39 and R48 to switch the logic output level of U15 and thereby change the states of the switches between $V_B$ and U14. This switch state change during the passage of a pulse through amplifier 26 disables integrator U14 to freeze its correction voltage into amplifier 26. The trailing edge of the pulse at $V_A$ re-enables the integrator to hold $V_B$ at zero volts until the next pulse arrives at $V_A$.

Output $V_B$ from the amplifier 26 goes both to the lower level discriminator 10 and through an analog switch 30 to be captured in a peak hold circuit 32. Pulses that exceed the reference of the lower level discriminator 10 are transmitted via a line driver to other instruments known in the art for making the density determination.

Assume $V_B$ is an electric pulse ready to pass through switch 30a into the peak hold circuit 32 for analog to digital conversion. The analog switch 30 is used to ensure that only one uncorrupted pulse at a time is captured and processed in the peak hold circuit 32 (the pulse stream is totally random in timing and pulses may arrive as rapidly as 70,000 per second). When a qualified pulse has been passed to the peak hold circuit 32, the switch 30a opens and the switch 30b closes to prevent any succeeding pulses from entering the peak hold circuit 32. Three conditions must be met for this switching to occur (see FIG. 5 for relative signal timing):

1. An EOC (End of Convert) signal from the digital circuit 18 must have pulsed from logic high to logic low and back to reset a flip flop 34. The EOC signal indicates that the digital side has finished processing the previously captured pulse.

2. A BUSY signal from a comparator 36 must go to a logic high indicating that the pulse passing through the switch 30a is large enough to qualify for processing.

3. A PEAK FOUND signal from a comparator 38 must go high to indicate that pulse rise time is complete. A pulse peak differentiator circuit 40 provides input to the comparator 38. Circuit 40 differentiates the pulse signal $V_A$ to locate the inflection point of the peak of the pulse. This action ensures that the switches 30a, 30b will switch immediately after transmitting the peak of the pulse.

With both BUSY and PEAK FOUND signals high into a NAND-gate 42, its output will go low to set flip flop 34. This action sends a logic low to a $\overline{CON}$ port of the analog switch 30 causing the switches 30a, 30b to switch, isolating the pulse peak captured in peak hold circuit 32. The switch 30a will stay open and the switch 30b closed until analog to digital conversion is complete and the digital side sends back a low going EOC pulse to reset flip flop 34, thus allowing the next available pulse to enter the peak hold circuit 32.

A high going signal, VALID PULSE, is generated by the flip flop 34 when it is set by the NAND gate 42. This signal tells the digital circuit 18 that a pulse peak has been captured and is ready to be processed. VALID PULSE is logically combined in a NAND gate 44 (see FIG. 6) with $\overline{COUNT/STOP}$ from a comparator 46 (FIG. 4) to create $\overline{CKEN}$. $\overline{CKEN}$ starts the analog to digital conversion described in the following paragraphs.

Still referring to FIG. 4, pulse peak height information is held as a voltage charge in a capacitor 48 ($C_S$) of the peak hold circuit 32. This information is read by timing the constant current discharge of the capacitor 48 using the expression:

$$\frac{ik}{C_S} = \frac{\Delta v}{\Delta t} = K,$$

where K is a constant, $\Delta v$ represents the peak height voltage stored in the capacitor 48 ($C_S$) and $\Delta t$ is the time to discharge down to a near zero fixed voltage. Thus the time of discharge is directly proportional to the magnitude of $\Delta v$.

The falling edge of $\overline{CKEN}$ performs two simultaneous functions. It enables a constant current peak discharge circuit 50 to discharge capacitor 48 (see FIG. 10D for a particular implementation, wherein the voltage on capacitor 48 discharges through R29, RA5 and Q1 towards the large stable negative reference voltage, $-V_{REF2}$; this discharge is an RC exponential but is sufficiently linear in the range of interest, namely, approximately the first ten percent of the difference between the pulse peak voltage and $-V_{REF2}$, to allow the above equation to be used). The falling edge of $\overline{CKEN}$ also enables an 8-bit counter 52 in the digital circuit 18 (see FIG. 6) to begin counting a 16.00 megahertz (MHz) clock. The voltage discharge of capacitor 48 is buffered to the comparator 46 shown in FIG. 4. When this voltage reaches the near zero volt reference of comparator 46, the output of the comparator 46 ($\overline{COUNT/STOP}$) snaps low forcing $\overline{CKEN}$ high, thereby stopping the 8-bit counter 52 and the discharge of the capacitor 48 at the same time. The digital circuit 18 then reads the counter's parallel output, stores the count as a particular bin value in the gamma-ray energy spectrum and when finished generates a negative-going EOC pulse. This EOC pulse clears the 8-bit counter 52 and resets the flip flop 34 so that the next available pulse may be acquired. A bin as referred to above is a memory address containing a digital count that increments by one each time a pulse having a magnitude for which the bin is designated is converted through the circuitry as just described for a given sample time.

The throughput gain of this circuitry is calibrated so that for the particular implementation the gamma-ray energy spectrum photopeak (662 keV) should fall in bin 100 out of 250 bins. Bin 100, for ease of computation, corresponds to 100 counts of the 16.00 MHz clock. Since each clock period is 62.5 nanoseconds a pulse peak exactly at the photopeak (bin 100) takes 6.25 microseconds to convert to a counter output of 100.

From the foregoing, a representation of sampled pulses is generated. The process includes: detecting energy responsive to radiation interaction events; generating electric pulses responsive to detected energies; and encoding the electric pulses so that portions of the resultant collected spectrum can be analyzed as subsequently explained. Encoding the electric pulses includes generating for a respective energy level within the collected spectrum a digital count of the number of electric pulses encoded as representing the respective energy level.

Digital Circuit 18

Figure 6:
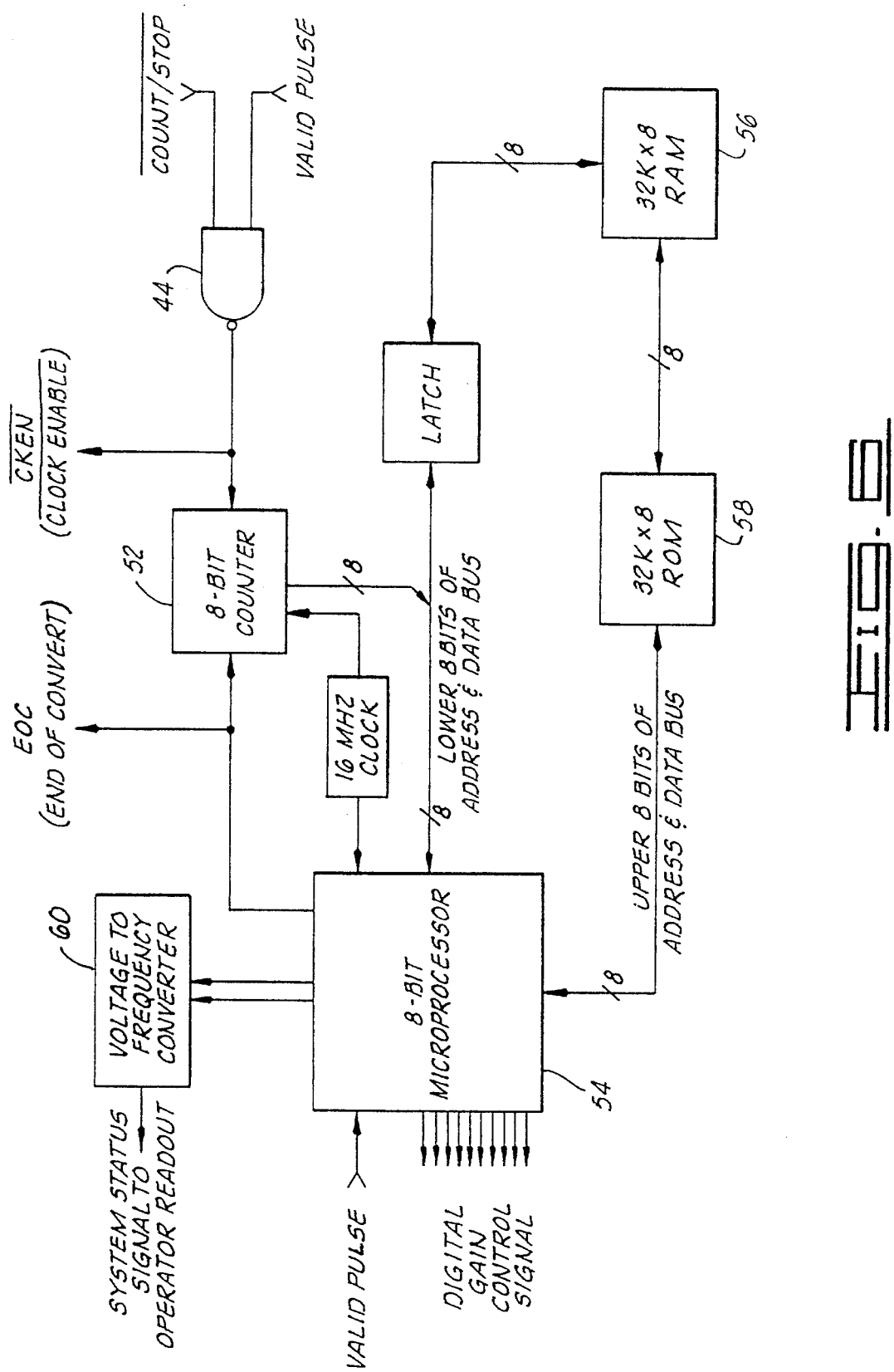
FIG. 6 is a block diagram of a digital circuit for implementing the present invention.

The spectrum collected and stored in the software bins is tested using automated digital means in the digital section 18, which includes an 8-bit microprocessor 54 running at 16 MHz, 32 kilobytes of random access memory 56, and 32 kilobytes for storage of the system firmware in a read only memory 58 as shown in FIG. 6. These components implement a programmed computer including: means for defining the storage bins in the computer; means for defining one of the storage bins as a predetermined bin where data representing a predetermined radiation interaction event energy (or photopeak, in this implementation) sensed by the radiation detector assembly should be stored (bin 100 in the particular implementation); means for generating respective data (the digital counts in the particular implementation) in response to output from the radiation detector assembly and for storing the generated data in respective bins; means for analyzing selected groups of bins for determining which group of bins includes a bin containing data representing the predetermined radiation interaction event energy and for determining whether the determined group includes the predetermined bin; means for generating a coarse adjustment signal for controlling the variable gain amplifier 16 in response to the means for analyzing determining that the determined group does not include the predetermined bin; and means for generating a fine adjustment signal for controlling the variable gain amplifier 16 in response to the means for analyzing determining that the determined group does include the predetermined bin. The means for analyzing includes: means for performing a first test using the stored data in bins within selected groups of bins, wherein a selected group of bins passing the first test is a candidate group; means for performing a second test using the stored data in bins within a candidate group, wherein the candidate group passing the second test is a correct candidate group; and means for performing a third test using the stored data in bins within the correct candidate group. A list of specific components and a specific implementation of a program for providing these means in conjunction with the hardware driven by such program are listed in the Appendix forming a part of this specification. The following further explains these means.

In general, the digital circuit 18 accepts and stores the incoming gamma-ray energy spectrum data, analyzes it to locate the photopeak, and sends corrective gain and status signals.

Knowledge of the unique and predictable shape characteristics of the gamma-ray energy spectrum for Cs-137 using a NaI detector in the particular implementation makes it possible to define a series of tests by which the photopeak location can be uniquely determined. These tests form a "rule set" which is encoded into the system firmware. The rule set includes a plurality of criteria collectively distinguishing the predetermined peak from other peaks in the collected spectrum that has also been encoded into the computer as described above. The gamma-ray energy spectrum monitoring and the resulting dynamic gain adjustment via this "rule set" is the feature which makes the present invention truly "intelligent". This intelligence is obtained by performing with the computer calculations of comparisons in response to the encoded rule set and the encoded spectrum.

One aspect of the rule set is to define or predetermine in which bin the identifiable photopeak should be located if the gain of the radiation detector assembly is correct. During initial calibration of the densimeter in the particular implementation, the position of the uniquely identifiable 662 keV photopeak is stationary; in the particular implementation it is defined as being located at bin 100 in the 0–250 interval if the gain of the densimeter is correct. This serves as the benchmark position in which the present invention strives to keep the peak. Any change in system gain causes the photopeak to drift above or below bin 100. If the acquired data meets all of the criteria for a valid gamma-ray energy spectrum, then the photopeak is located using the rule set and appropriate gain calculations are carried out to shift it back to bin 100. Although the data acquisition phase of the particular implementation requires ten seconds, the entire analysis algorithm executes in less than one second in the particular implementation.

During data acquisition as described above with regard to the analog circuit 14, the conversion of a sensed electric pulse into an increment to a digital count retained in a respective bin includes first converting the pulse to a count of a number of periods of a reference oscillator. The frequency of the oscillator determines pulse height resolution. Pulses of the same height (within system resolution) correspond to the same oscillator count, and contribute an increment of one to the associated bin. This conversion occurs in ten second intervals (sampling cycles) so that at the end of each conversion period, the bins contain digital counts of the number of pulses of the same energy sensed during the conversion period, thereby collecting a gamma-ray energy spectrum within the computer memory.

This gamma-ray energy spectrum data in the bins is sorted by the computer of the digital circuit 18 into coarse "groups" of five bins each to find which group contains the highest number of counts. In the particular implementation, the first three bins (0, 1, 2) containing the digital counts at the lowest energy levels of the spectrum are not used because of noise effects typically included at these levels; therefore, group 1 contains bins 3, 4, 5, 6, and 7; group 2 contains bins 8, 9, 10, 11, and 12; etc. Accordingly, each group is centered about a bin whose identifying number is a multiple of 5. Group 20 thus is centered on bin 100, which is the bin where the digital count representing the predetermined 662 keV photopeak should be in the particular implementation.

It is known for the particular implementation that the "coarse" group in which the true photopeak resides typically holds between 3% and 20% of the total counts in the gamma-ray energy spectrum. Thus, a first test of the rule set uses this criterion to determine if a selected group is a candidate to contain a bin having a digital count that is supposed to represent the predetermined photopeak. To perform this test, the digital counts of the bins within each group are summed. The group with the greatest sum is then tested by dividing its total digital count by the total digital counts of all groups. If the total of the digital counts in the tested group does not lie within the 3%–20% percentage range, the tested group is eliminated from further consideration as the group in which the photopeak could be contained. The group with the next highest sum is then tested, and so on until a group is found that passes this first test.

This first test prevents the particular implementation from interpreting relative maxima in the gamma-ray energy spectrum as the true photopeak. Disqualification of the Compton edge, backscatter peak, and possible noise inputs from photopeak candidacy is important since the proper gain control signal cannot be sent to the variable gain amplifier 16 unless the true photopeak is found in the gamma-ray energy spectrum sample.

When a group passes the "percentage" test, a second test awaits. The criterion for this second test in the particular implementation is that the photopeak candidate group must contain twenty times more counts than any group to its right, with the exception of the five groups immediately to its right which are not considered because the selected candidate group could be at the left of the desired peak so that it would not be twenty times greater than the next immediate groups defining the remainder of the peak.

This "rightmost" test prevents the present invention from using a peak which is to the left of the real photopeak. More generally, this second criterion distinguishes relative positioning of a maximum within the encoded spectrum.

If a group passes the first and second tests, it is the correct candidate group in the particular implementation (i.e., it does include the bin having the digital count for the predetermined photopeak). This group is checked to see if it is group 20 which includes bin 100 where the photopeak digital count should be stored. This test determines whether the identified peak is relatively far from or near to the actual energy level it is supposed to be representing in the spectrum (i.e., whether the identified peak is inside or outside a predetermined range of the predetermined energy level of the encoded spectrum).

If the correct candidate group is not group 20, then a coarse gain adjustment is calculated and applied, and the gamma-ray energy spectrum resampled until this third criterion is satisfied. In the particular implementation, this coarse gain adjustment is computed as an adjustment multiplier determined by dividing 20 (the bin number where the peak should be) by the number of the bin where the peak actually is located. Thus, if the peak has been shifted to the left of where it should be (i.e., it is in a group below group 20), a factor greater than 1 is generated to increase the gain of the variable gain amplifier 16; and if the peak has been shifted to the right of where it should be (i.e., it is in a group above group 20), a factor less than 1 is generated to decrease the gain. This should bring the peak within a fine tuning range inside group 20 within three or four sampling cycles in the particular implementation; if not, the variable gain amplifier 16 is set to a gain of one and an error signal is transmitted to the operator readout 12.

If the correct candidate group is group 20, then a further test is performed, which consists of comparing the count rate in the entire collected spectrum with preset upper and lower count rate limits. If the count rate does not lie within these limits, an error message is sent to the operator readout 12, and the gain remains as previously determined. Regardless of the outcome of this further test, a set of fine gain adjustment calculations are performed. These calculations involve the subtraction of counts accumulated due to Compton scattering interactions under the photopeak and the subsequent determination of the centroid of the predetermined photopeak in the limited neighborhood about bin 100. This fine tuning adjustment in the particular implementation specifically includes subtracting the respective Compton continuum count from the gross digital count in each bin of the group to define a true net peak count in each such bin. A count-channel weighted average is then computed to define the centroid. This includes calculating for the group a sum of the products of the respective bin numbers and their respective net counts, calculating a sum of the total net counts in the group and dividing the former sum by the latter sum. The foregoing steps as to subtracting the Compton continuum and computing the count-channel weighted average are conventional techniques known within the art. The resultant fine gain signal is then generated by multiplying the previous gain value by a gain adjustment factor of 100 (i.e., the predetermined bin where the centroid should be) divided by the calculated centroid.

The foregoing steps are carried out automatically by the present invention. No operator intervention is needed unless a serious fault is noted such as referred to above regarding correction not occurring within a predetermined number of sampling and gain calculation cycles. Thus, status signals are the only indication of the operation of the present invention system. To accomplish this, a voltage-to-frequency converter 60 (FIG. 6) receives input from the processor 54 at regular intervals. These inputs are mapped to frequencies which are interpreted at the operator readout 12, and displayed as a text message alongside the density reading. The particular implementation has the capability of supplying as many as four distinct message frequencies, but presently, only three are used. The currently defined status messages are:

1. gamma-ray energy spectrum data acquisition (a sampling cycle) in progress
2. analysis and gain calculation in progress
3. error—peak cannot be located or count rate is out of limits.

Normally, message 1 is sent for ten seconds, then message 2 is sent briefly (approximately one second), and back to message 1. If there are problems such that the present invention cannot perform its function, message 3 is sent, and a default gain of one is supplied to the variable gain amplifier 16. The error message alone represents an advance in densimeter technology because at a minimum, the operator can know if the density reading is credible.

The foregoing has been a specific example of the present invention; however, the present invention is not limited to such specifics. It is contemplated that the present invention can be applied to any system having a spectrum which can be both consistently characterized and measured, and which is subject to gain drifts which result in output error. The specific set of rules governing the recognition of spectrum characteristics and the method of spectral data acquisition can vary with each application but remain within the scope of the present invention, the method of which invention can be defined broadly either as:

(a) automatically determining which of a sample of the output electric pulses are to represent a predetermined radiation energy and determining whether these output electric pulses actually designate the predetermined radiation energy; and (b) automatically adjusting the output of the radiation detection instrument (specifically via the variable gain amplifier 16 in the illustrated embodiment) in response to determining that the sampled output electric pulses that are to represent the predetermined radiation energy do not designate the predetermined radiation energy, or as:

collecting an energy spectrum using the radiation detection instrument; testing the collected spectrum against a predetermined rule set to determine automatically both where the predetermined peak is in the collected spectrum and whether the located predetermined peak is at the predetermined energy level in the collected spectrum; and adjusting the output of the radiation detection instrument, in response to testing the collected spectrum, so that the predetermined peak of at least a subsequently generated spectrum is at the predetermined energy level within the subsequently generated spectrum.

Figure 7:
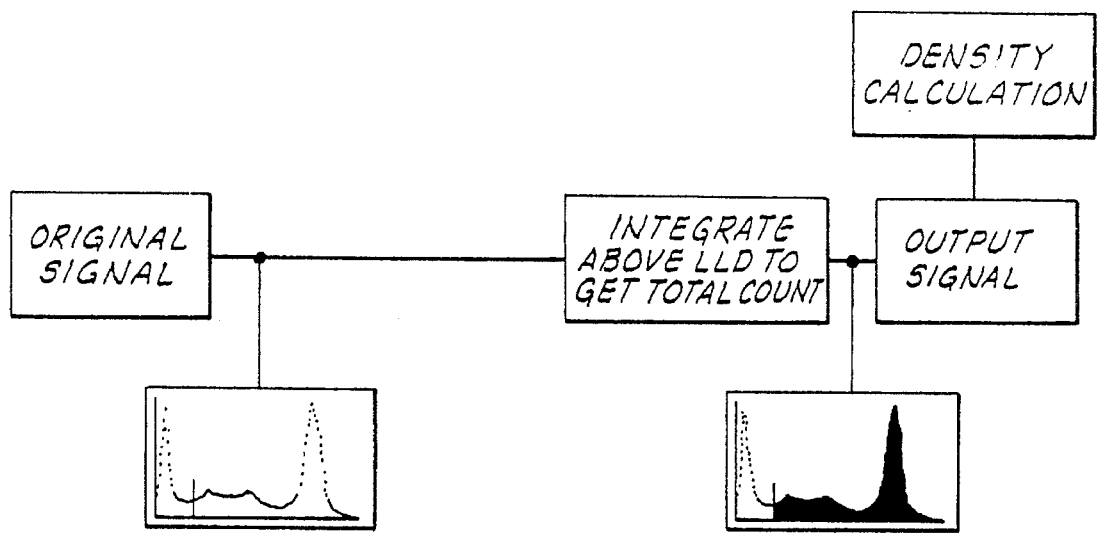
FIG. 7 illustrates an energy spectrum output for an ideal densimeter system.
Figure 8:
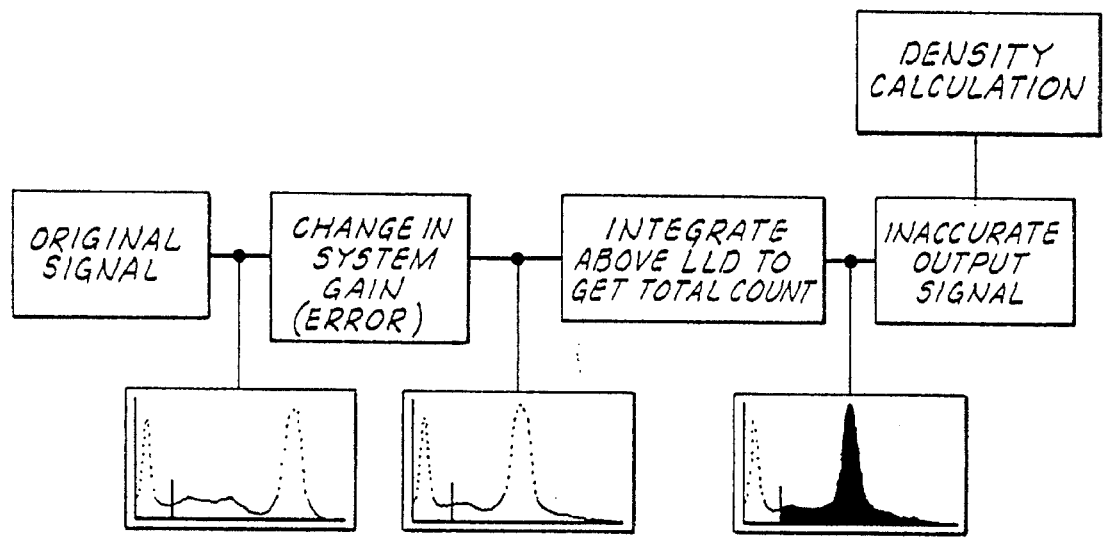
FIG. 8 illustrates an uncorrected real densimeter system.
Figure 9:
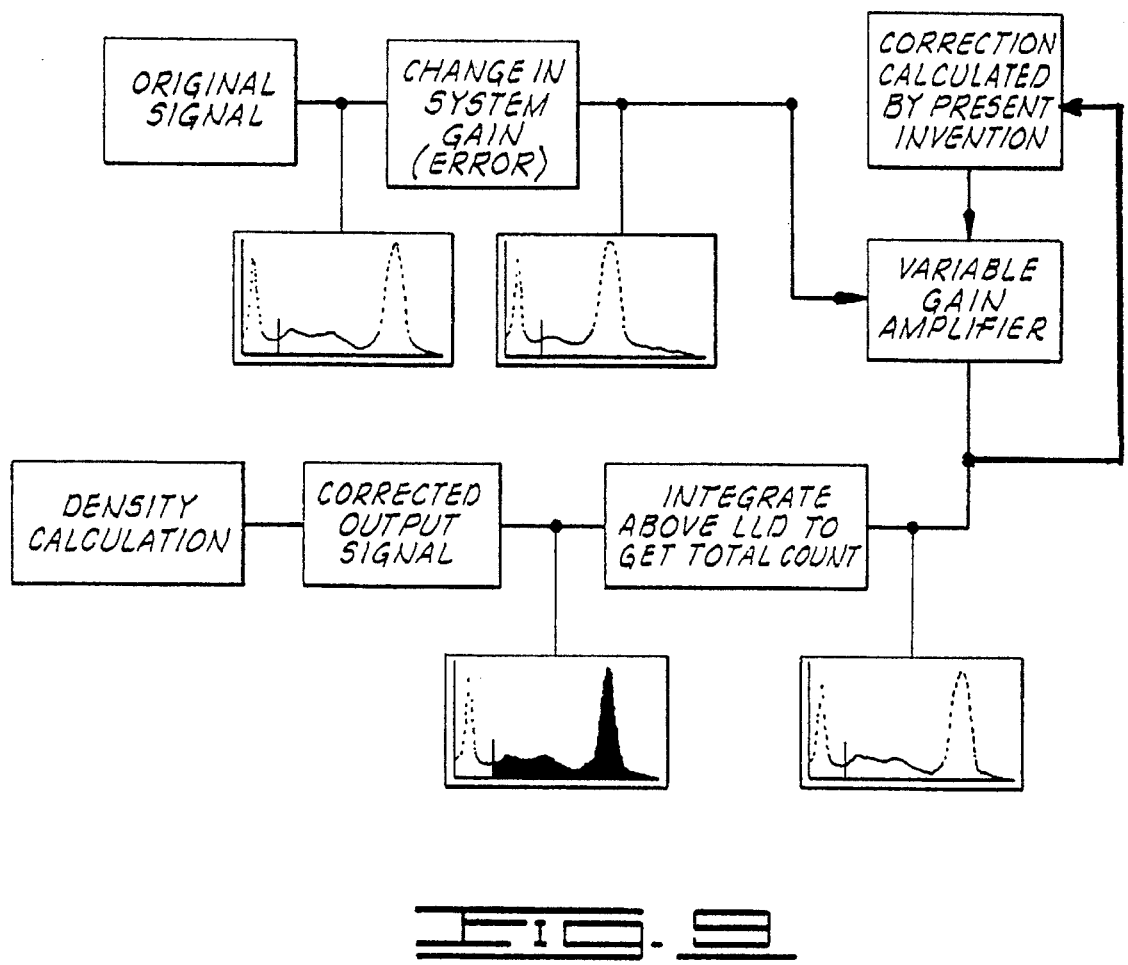
FIG. 9 illustrates a real densimeter system utilizing the present invention.

An illustration of the utility of the present invention is given in FIGS. 7–9. The dark vertical bar shown in each gamma-ray energy spectrum of these figures is the lower level discriminator, which provides a useful reference point in demonstrating gamma-ray energy spectrum changes. All counts to the right of the lower lever discriminator contribute to the eventual density measurement.

FIG. 7 depicts signal processing for an ideal densimeter system in which no system gain changes occur. The conversion of the energy in each detector event to an electrical pulse is constant over time and across the gamma-ray energy spectrum. Hence, the photopeak position and gamma-ray energy spectrum shape does not change once the unit is calibrated. If all densimeters behaved like this, there would be no need for the present invention.

FIG. 8 illustrates signal processing for a real densimeter system like those currently in field use. Here a lowering of the system gain is illustrated. The spectrum shift results in an erroneous lowered count rate at the output. The operator may or may not be aware of the discrepancy, and could incorrectly interpret the actual density in the flow line.

FIG. 9 illustrates the present invention's solution to the shortcoming of FIG. 8. The system's gain changes are corrected by circuitry that monitors the gamma-ray energy spectrum and calculates the gain necessary to shift the spectrum back to its position at calibration. Because the photopeak is continually monitored and kept at its correct location, the total number of counts above the lower level discriminator will then yield the correct density measurement at the operator readout.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

APPENDIX

| PART NUMBER | DESCRIPTION AND MANUFACTURER |
|---|---|
| P80C31BH-1 | 16 MHz 8-bit microcontroller (Intel) |
| SN74HCT573N | D-type latch (Texas Instruments) |
| HN27C256-20 | 32K x 8 CMOS EPROM (Hitachi) |
| TC55257PL-12 | 32K x 8 low power RAM (Toshiba) |
| SN74HC590AN | 8-bit binary counter with tri-state outputs (Texas Instruments) |
| MC74HC00AN | Quad 2-input NAND (Motorola) |
| BBVFC32-BM | Voltage-to-frequency converter (Burr-Brown) |
| MX055GA2C | 16 MHz crystal oscillator (CTS Knights) |

A1

```
/**********************************************************************/
/* gain.c -- Tim Rice            12/19/89   11:30 a.m.                */
/*           Last Modified       11/16/92   10:15 a.m.                */
/*           Software for Gain Stabilization Controller               */
/*           Project No.: E-619-0096    Based on 80C31+32K ROM+32K RAM */
/*                      & E-619-0117    using a 74HC590 for A/D       */
/**********************************************************************/
/**********************************************************************/
/* Software after 05/10/90 includes provisions for operation at 16 MHz. */
/* Code was changed in two subroutines, gain_conversion and default_gain, */
/* to allow gain to exceed 2.00.  This change was effective 10/27/92.  */
/**********************************************************************/
#include <math.h>                       /* get help with calculations */

/**********************************************************************/
/*                                                                    */
/*           Define Register, Bit, and Port Assignments               */
/*                                                                    */
/**********************************************************************/
#define TMOD         0x89               /* Timer mode register        */
#define TH1          0x8D               /* T1 is time base timer      */
#define TL1          0x8B
#define TR1_bit      0x8E               /* Turns Timer 1 on/off       */
#define PT1_bit      0xBB               /* Timer 1 interrupt priority */
#define PX0_bit      0xB8               /* Ext. interrupt #0 priority */
#define ET1_bit      0xAB               /* Timer 1 overflow interrupt */
#define EA_bit       0xAF               /* Acknowledge interrupts     */
#define EX0_bit      0xA8               /* enables extern. intrpt. 0  */
#define IT0_bit      0x88               /* extern. interpt. 0's type  */

/**********************************************************************/
/*                                                                    */
/*   Port 0                                                           */
/*         Serves as I/O for the low 8 bits of ROM and RAM addressing, */
/*         and as the memory mapped 74HC590 counter at location 8000h. */
/*                                                                    */
/**********************************************************************/
/**********************************************************************/
/*                                                                    */
/*   Port 1                                                           */
/*         Used as the low 8 bits of the 10-bit digital gain signal that */
/*         is sent to the DAC controlling the variable gain amplifier. */
/*                                                                    */
/**********************************************************************/
/**********************************************************************/
/*                                                                    */
/*   Port 2                                                           */
/*         Serves as I/O for the high 8 bits of ROM and RAM addressing. */
/*                                                                    */
/**********************************************************************/
/**********************************************************************/
/*                                                                    */
/*   Port 3                                                           */
/*         Used as a multifunction I/O port.  The bit functions are:  */
/*                                                                    */
/*         P3_0    the ninth bit of the 10-bit digital gain output signal */
```

```
/*          P3_1    the tenth (MSB) bit of the 10-bit gain output         */
/*          P3_2    Valid pulse ready signal                              */
/*          P3_3    Blue "Taking data or Counting..." indicator           */
/*          P3_4    EOC End of Conversion signal sent to R/S flip-flop    */
/*          P3_5    Fail/OK status indicator.  (0 = OK, 1 = Fail)         */
/*          P3_6    (WR)' signal output to RAM and ADC                    */
/*          P3_7    (RD)' signal output to RAM and ADC                    */
/*                                                                        */
/************************************************************************/
#define P0          0x80            /* Port 0 address                    */
#define P1          0x90            /* Port 1 address                    */
#define P2          0xA0            /* Port 2 address                    */
#define P3          0xB0            /* Port 3 address                    */
#define P3_0_bit    0xB0            /* Bit 9 of 10-bit DAC signal        */
#define P3_1_bit    0xB1            /* MSB of 10-bit DAC signal          */
#define P3_2_bit    0xB2            /* Valid pulse ready signal          */
#define P3_3_bit    0xB3            /* signal latches gain to DAC        */
#define P3_4_bit    0xB4            /* End of conversion (EOC)           */
#define P3_5_bit    0xB5            /* Fail/OK status indication         */
#define P3_6_bit    0xB6            /* Write prime signal                */
#define P3_7_bit    0xB7            /* Read prime signal                 */

/************************************************************************/
/*                                                                        */
/*        Variable Declarations and Initialization of Constants           */
/*                                                                        */
/************************************************************************/
/************************************************************************/
/* CAUTION:                                                              */
/*        Don't set coarse_gain to 0.                                    */
/*        top should always be greater than bottom.                      */
/*        right_half_max should always be greater than left_half_max.    */
/*        count_time and tc are given in units of seconds.               */
/*        count_time and tc should match, since tc is just the floating  */
/*           point version of count_time.  (For 12 MHz operation)        */
/*        count_time should be 1.5 times tc for 16 MHz operation.        */
/*        Never set count_time or tc greater than 32767. (over 9 hours)  */
/*        alarm_count is set to roll over at 20, which is 1 second.      */
/*        The first (111-k-l-2) cells of centroid array[] are unused.    */
/*        The highest index of centroid array[] has been set to 150, so  */
/*           it should be well out of the way of the photopeak's range.  */
/*           In case it must be changed, it must be greater than top+1,  */
/*           and greater than (k+r+1).  Otherwise, the memory containing */
/*           centroid and fine_gain will be overwritten.                 */
/*        Never set maxbin = 0.  A premature failure condition may occur.*/
/*        Due to the slow relative speed of the 8031, maximum_counts is  */
/*           not being used as a constraint in the algorithm.  (4/25/90) */
/*        When the uP crystal is changed between 12 or 16 MHz, the timer */
/*           related code will need to be adjusted accordingly.          */
/************************************************************************/
/************************************************************************/
/* This table gives an indication of how the timer structure has been done */
/* so no confusion will arise...use it to check the values of count_time */
/* and tc.                                                               */
/*                                                                        */
/*              # of real seconds                              timer     */
```

```
/*  Hex     Decimal    12MHz        16MHz       count_time x alarm_count rollovers */
/*  -----|----------|-------------------------|-------------------------|--------- */
/*  4EDA    20186    .0453495     .0340125          15             20        300   */
/*  5264    21092    .0444444     .0333333          15             20        300   */
/*                                                                                 */
/*********************************************************************************/
unsigned int alarm_count = 0;              /* used to measure 10s alarm    */
unsigned long maximum_counts = 131072;     /* max counts incoming in 10s   */
unsigned long no_of_counts;                /* number of counts received    */
float initial_gain = 1.0;                  /* default gain at power up     */
unsigned int finebins[256];                /* storage cells bins[0-255]    */
unsigned int fine_gain_flag = 0;           /* send fine or coarse gain?    */
unsigned long coarsebins[51];              /* lumped bins[0-50] storage    */
int i;                                     /* for-next loop counter        */
int j;                                     /* 5-multiples of i             */
float maxbin;                              /* used for max. coarsebin      */
float tc_percentage_min = 0.03;            /* peak candidate criteria      */
float tc_percentage_max = 0.20;            /* peak candidate criteria      */
float m = 20.0;                            /* peak candidate criteria      */
float sum;                                 /* peak candidate criteria      */
int p=0;                                   /* for-next loop counter        */
int peak_bin;                              /* bin # of peak candidate      */
float t_min_cps = 8000;                    /* min. counts/sec taken in     */
float t_max_cps = 60000;                   /* max. counts/sec taken in     */
float tc = 10.0;                           /* # of seconds data is taken   */
int cycle = 0;                             /* # of coarse adjusts          */
float desired_peak = 20;                   /* where we want peak to be     */
float coarse_gain = 1.0;                   /* gain from coarse testing     */
float peak_ratio;                          /* maxbin counts/sum counts     */
int count_time = 15;                       /* this must = tc at 12 MHz!    */
int buzzer;                                /* helps keep track of time     */
int bottom = 90;                           /* low bin for fine analysis    */
int top = 110;                             /* high bin for fine analysis   */
int k;                                     /* subscript of max. finebin    */
unsigned int fine_maxbin;                  /* # counts in max. finebin     */
int l = 9;                                 /* # channels below photopeak   */
int r = 10;                                /* # channels above photopeak   */
float avg_bckgnd_left;                     /* avg. backgnd. counts left    */
float avg_bckgnd_right;                    /* avg. backgnd. counts right   */
float slope;                               /* slope of line from abr-abl   */
float b;                                   /* y-intercept of abr to abl    */
int n;                                     /* loop counter/subscript       */
float centroid_array[150];                 /* [(k-l-1)-(k+r+1)] has data   */
float centroid;                            /* centroid of photopeak        */
float fine_gain;                           /* fine gain value              */
int left_half_max = 4;                     /* used to find peak centroid   */
int right_half_max = 4;                    /* used to find peak centroid   */
float divisor;                             /* used to find peak centroid   */
int no_of_bits;                            /* # of bits (0-1023) to send   */
float gain_out;                            /* gain to send out to DAC      */
float pc = 100;                            /* location of peak centroid    */
extern void ZeroCount();                   /* assembly code - clears RAM   */
extern void ReadCount();                   /* assembly code - reads data   */
extern void Internalize();                 /* assembly - internal vars.    */

/*********************************************************************************/
```

A4

```
/*                                                                       */
/*                         Functions                                     */
/*                                                                       */
/***********************************************************************/
/***********************************************************************/
/* The following function sets up Timer 1, which will be internally     */
/* controlled.  Timer 1 is turned on from the main routine when the system */
/* has been initialized.  Timer 1 is stopped either when count_time has  */
/* expired, or when the maximum number of event counts desired has been  */
/* reached.  Calculation based on data taken may then proceed.  Timer 1 is */
/* reset after the sending of each new gain value, and prior to the     */
/* filling of the energy bins on a new set of event data.               */
/* alarm_count is incremented every time the internal timer rolls over to */
/* 0.  When alarm_count reaches 20, buzzer is incremented, and alarm_count */
/* rolls back over to 0.  This continues until the value of buzzer equals */
/* the value of count_time, then processing begins.  See timer table !!  */
/***********************************************************************/
void init_timer()                  /* This procedure is done once, just after */
   {                               /*      power up.                         */
      output(TMOD,0x10);           /* Timer 1 is configured as a 16-bit timer */
                        /*        under internal control.              */
      output(TH1,0x52);            /* Put the number to begin counting from in */
      output(TL1,0x64);            /*     Timer 1.  (5264 = 21092, which gives */
                        /*    about a 33.333ms count time from   */
                        /*    21092 up to 65536.)   300 x 33.333ms */
                        /*    should give 10 seconds.            */
      set_bit(ET1_bit);            /* Enable Timer 1's interrupt.            */
   }

/***********************************************************************/
/* This routine sends the default gain of 1 out to the 10-bit DAC.      */
/* 0111000111 is the midscale gain value, with 0000000000 providing a gain */
/* of 0 and 1111111111 a gain of 2.248351649.                           */
/***********************************************************************/
void default_gain()
   {
      clear_bit(P3_1_bit);         /* 0                                     */
      set_bit(P3_0_bit);           /* 1                                     */
      output(P1,0xC7);             /*   11000111                            */
   }

/***********************************************************************/
/* Here is the code which alerts the operator that something is critically */
/* wrong with the system; i.e. the photopeak cannot be located.  An LED on */
/* the control panel will be lit in case of failure.  This subroutine   */
/* should be accessed only when the coarse search for the photopeak and */
/* any subsequent gain adjustments have failed after four cycles.       */
/***********************************************************************/
void send_alarm()
   {
      set_bit(P3_5_bit);           /* No peak after 4 cycles.  Turn on red LED */
      coarse_gain = 1.0;           /* Send out default gain here...         */
      fine_gain_flag = 0;
      cycle = 0;                   /* reset cycles and try again...         */
   }
```

```
/******************************************************************/
/* This code handles the fine analysis of the data after the valid */
/* photopeak has been found and/or adjusted to be in the desired bin. */
/* First, a sort is performed to find k, the finebin with the most counts */
/* in it.  This value of k is then used with l and r (preset values) to */
/* determine abl and abr average background range endpoints.  The slope of */
/* the line connecting abl and abr and that line's y-intercept are found. */
/* The centroid of the photopeak may now be calculated, and a fine gain */
/* adjustment sent out.  See photopeak diagram for help on the following: */
/*                                                                  */
/*      fine_maxbin         # of counts in the finebin having most counts */
/*      i                   serves as a loop counter                */
/*      bottom              subscript of a finebin left of the photopeak */
/*      top                 subscript of a finebin right of the photopeak */
/*      k                   subscript of the finebin having the most counts */
/*      avg_bckgnd_left     (abl) avg. background counts in three adjacent */
/*                              finebins somewhere to the left of the peak */
/*      avg_bckgnd_right    (abr) avg. background counts in three adjacent */
/*                              finebins somewhere to the right of the peak */
/*      slope               slope of line from abl to abr           */
/*      b                   y-intercept of line from abl to abr     */
/*      centroid array      cells contain the # of counts remaining in each */
/*                              of the finebins from (k-l-1) to (k+r+1) after */
/*                              the background counts have been removed */
/*      centroid            centroid of the photopeak region        */
/*      divisor             sum of counts in centroid array cells having */
/*                              subscripts in the appropriate range */
/*      left_half_max       # of finebins left of photopeak         */
/*                              (bottom < left_half_max < k)        */
/*      right_half_max      # of finebins right of photopeak        */
/*                              (k < right_half_max < top)          */
/*      fine_gain           the calculated fine gain adjustment for the DAC */
/*      pc                  the desired finebin # of the peak centroid */
/******************************************************************/
void fine_analysis()
   {
     fine_maxbin = 0;
     for (i = bottom; i <= top; i++)
        {
        if (finebins[i] > fine_maxbin)
           {
            fine_maxbin = finebins[i];
            k = i;
           }
        }
     avg_bckgnd_left = ((finebins[k-l] + finebins[k-l-1] + finebins[k-l-2]) / 3);
     avg_bckgnd_right = ((finebins[k+r] + finebins[k+r+1] + finebins[k+r+2]) /
3);
     slope = ((avg_bckgnd_right - avg_bckgnd_left) / ((k+r+1) - (k-l-1)));
     b = (avg_bckgnd_left - (slope * (k-l-1)));
     for (n = (k-l-1); n <= (k+r+1); n++)
        {
         centroid_array[n] = finebins[n] - ((slope * n) + b);
        }
     centroid = 0;
     divisor = 0;
```

```
      for (n = (k-1-left_half_max); n <= (k+1+right_half_max); n++)
        {
        centroid = centroid + (n * centroid_array[n]);
        divisor = divisor + centroid_array[n];
        }
      centroid = centroid / divisor;
      if (fine_gain_flag == 1)
          fine_gain = ((fine_gain * pc) / centroid);       /* use most recent */
      else                                                 /* gain value to   */
          fine_gain = ((coarse_gain * pc) / centroid);     /* "build" upon    */
      fine_gain_flag = 1;
      }

/**********************************************************************/
/* This code takes the finebin (1-255) data and converts it to coarse (50) */
/* bin data.  Coarse bin 10 contains the sum of the five fine bins between */
/* 48 and 52 inclusive.  Coarse bin 49 contains the sum of the five fine   */
/* bins between 243 and 247 inclusive.  Fine bins 0-47 and 248-255 are not */
/* accounted for.  Finally, a special total, "sum," (finebins [10-250]),   */
/* which is not the same as no_of_counts, is calculated.                   */
/**********************************************************************/
void coarse_bin_conversion()
    {
                        /* coarse            fine                  */
                        /* [10]= [48] +[49]+ [50]+ [51]+ [52] */
    for (i = 10; i <= 50; i++)   /* [11]= [53] +[54]+ [55]+ [56]+ [57] */
        {                        /* [12]= [58] +[59]+ [60]+ [61]+ [62] */
        j = (i * 5)     ;        /* [13]= [63] +[64]+ [65]+ [66]+ [67] */
        coarsebins[i]+=finebins[j-2];/* [14]= [68] +[69]+ [70]+ [71]+ [72] */
        coarsebins[i]+=finebins[j-1];/* [20]= [98] +[99]+[100]+[101]+[102] */
        coarsebins[i]+=finebins[j];  /* [46]=[228]+[229]+[230]+[231]+[232] */
        coarsebins[i]+=finebins[j+1];/* [47]=[233]+[234]+[235]+[236]+[237] */
        coarsebins[i]+=finebins[j+2];/* [48]=[238]+[239]+[240]+[241]+[242] */
        }
    for (i = 0; i <= 255; i++)
        {
        no_of_counts = no_of_counts + finebins[i];
        }
    sum = no_of_counts -
(finebins[0]+finebins[1]+finebins[2]+finebins[3]+finebins[4]+finebins[5]+finebin
s[6]+finebins[7]+finebins[8]+finebins[9]+finebins[10]+finebins[251]+finebins[252
]+finebins[253]+finebins[254]+finebins[255]);
    }

/**********************************************************************/
/* This routine examines the coarsebin data and finds one with most counts */
/* in it.  Two "goto" statements are used here, but, after extensive tests */
/* were conducted using normal function calls and returns, and due to the  */
/* the nested structure of the code, it was decided that any other way     */
/* would be pure torture on the programmer, the stack, and the simulator.  */
/* Then the coarsebin with the maximum counts in it is tested to see if it */
/* is indeed the actual photopeak.  The peak candidate that survived the   */
/* sort must meet two criteria here:                                       */
/*      The percentage of total counts contained in the peak candidate     */
/*      must be between tc_percentage_min and tc_percentage_max, and       */
/*      the total counts contained in the peak candidate must be m times   */
```

```
/*        greater than each of the bins between the (peak candidate bin + 5)  */
/*        and coarsebin 50.  If the peak candidate doesn't meet these          */
/*        criteria, it is an imposter.  That peak candidate bin is then        */
/*        zeroed out, and a new peak candidate is found from the               */
/*        max_coarsebin_sort() routine, until the real peak turns up.          */
/*        The cycle counter is incremented.  Now the peak is checked to see    */
/*        if its bin is the same as the desired bin, and whether or not the    */
/*        number of counts per second is within a specified range.  If so,     */
/*        a new spectrum is taken, and a gain value is sent.  When the peak    */
/*        is where it should be, the fine analysis of the data may begin.      */
/*        If the fine analysis has not begun after four cycles, the failure    */
/*        steps are taken.                                                     */
/*                                                                             */
/*        i                       serves as the loop counter                   */
/*        tc_percentage_min       min % of total counts peak may contain       */
/*        tc_percentage_max       max % of total counts peak may contain       */
/*        maxbin                  number of counts in the "biggest" bin        */
/*        sum                     number of counts in finebins 10-250          */
/*        peak_ratio              (maxbin / sum)                               */
/*        peak_bin                contains subscript of the "biggest" bin      */
/*        cycle                   # of attempts to find/put peak in right bin  */
/******************************************************************************/
void max_coarsebin_sortntest()
    {
    peak_bin = 0;
    sort:
        maxbin = 0.75;                  /* Give maxbin some nominal value... */
        for (i = 10; i <= 42; i++)      /* This used to be 10!!    5/23/90   */
        {
         if (coarsebins[i] > maxbin)
            {
             maxbin = coarsebins[i];
             peak_bin = i;
            }
        }
    peak_ratio = (maxbin / sum);
    if ((!(tc_percentage_min < peak_ratio) && (peak_ratio < tc_percentage_max)))
        {
                            /* candidate passes test #1 */
        }
    else
        {
     if ((maxbin > 0.5) && (!(maxbin == 0.75)))
            {
             coarsebins[peak_bin] = 0;          /* eliminate that bin     */
             goto sort;                         /* it fails test #1       */
            }
        }
    for ((p = (peak_bin + 5)); p <= 50; p++)
        {
     if (!(maxbin == 0.75))
            {
             if (maxbin > (m * coarsebins[p]))
                {
                            /* candidate passes test #2 */
                }
```

A8

```
      else
        {
        if (maxbin > 0.5)
          {
                              /* candidate disqualified    */
            coarsebins[peak_bin] = 0;  /* eliminate it altogether  */
            goto sort;
          }
        }
      }
    }
  cycle++;
  if (peak_bin == desired_peak)
    {
    if ((t_min_cps < (sum/tc)) && ((sum/tc) < t_max_cps))
      {
      clear_bit(P3_5_bit);                 /* turn on the green LED    */
      }
    else
      {
      set_bit(P3_5_bit);                   /* turn on the red LED if   */
                                   /* count rate is too low,   */
                                   /* but don't disturb gain!! */
      }
    cycle = 0;                             /* reset cycle counter now  */
    fine_analysis();                       /* OK! Do the fine analysis */
    }
  else
    {
    if ((cycle >= 4) || (maxbin < 0.5))   /* after 4 tries, or if no   */
                                 /* data came at all, S.O.S! */
      {
      send_alarm();
      }
    else
      {
      coarse_gain = (coarse_gain * (desired_peak / peak_bin));
      fine_gain_flag = 0;
      if (peak_bin == 0)
        {
        coarse_gain = 1;
        }
      if (maxbin == 0.75)              /* peak_bin would have the  */
        {
        coarse_gain = 1.0;             /* wrong value, and the     */
                              /* gain would be wrong if   */
                              /* not for this check...    */
        }
      if (coarsebins[peak_bin] < 100)   /* this provides for noisy  */
        {                               /* spectra when noise may   */
        coarse_gain = 1;                /* cause a "peak" to occur, */
        }                               /* but the total counts are */
      }                                 /* far too low, i.e. when   */
    }                                   /* the PMT or high voltage  */
}                                       /* stop altogether. 8/9/90  */
```

```
/*******************************************************************/
/* This routine determines the gain value from the data already stored.   */
/* Since a 10-bit DAC is being used, a range of 0-1023 exists.  The gain  */
/* ranges from 0 - 2.248351649, so each bit is .002197802 units of gain.  */
/* (Actually, the currently useful gain range is .45--2.248351649, but for*/
/* future considerations, this version allows for the range from 0 - 0.45)*/
/*                                                                        */
/* An extension of gain range down to 0.45 was added 5/17/90.             */
/* An extension of gain range up to 2.25 was added 10/26/92.              */
/*                                                                        */
/*           Gain        Decimal Value     10-bit binary representation   */
/*           0.00           0                   0000000000                */
/*           0.279120879    127                 0001111111                */
/*           0.45           204.75 - Lowest used -                        */
/*           0.5            227.5                                         */
/*           0.56043956     255                 0011111111                */
/*           0.841758242    383                 0101111111                */
/*           1              455                 0111000111                */
/*           1.123076923    511                 0111111111                */
/*           1.404395604    639                 1001111111                */
/*           1.5            682.5                                         */
/*           1.685714286    767                 1011111111                */
/*           1.967032967    895                 1101111111                */
/*           2              910                 1110001110                */
/*           2.248351649    1023                1111111111                */
/*                                                                        */
/* Gain and the number of bits are linearly related by these equations:   */
/*                                                                        */
/*                gain = m(number of bits)                                */
/*        number of bits = gain / m                                       */
/*                                                                        */
/*    where m, (the slope of the gain vs. bits line), is 0.002197802.     */
/*                                                                        */
/* The actual gain value in 10-bit binary terms is sent by running the    */
/* no_of_bits through a small sort routine which chooses exactly which    */
/* bits (P3_1, P3_0, and all of P1) to set or clear.                      */
/*******************************************************************/
void gain_conversion()
   {
   if (fine_gain_flag == 0)              /* What kind of gain is being sent? */
      gain_out = coarse_gain;            /* Coarse.                          */
   else
      gain_out = fine_gain;              /* Fine.                            */ if (sum < (1000*tc))                  /* <-- added 11/16/92 to            */
      gain_out = 1;                      /* prevent locking on pulser        */
                                         /* input in one bin only.           */
                                         /* Used during calibration.         */ no_of_bits = (gain_out / 0.002197802);  /* <-- changed this   */
   if (no_of_bits < 0)                     /* 10/26/92.          */
     {
     clear_bit(P3_1_bit);                  /* Send out a nominal */
     set_bit(P3_0_bit);                    /* gain of one if gain */
     output(P1,0xC7);                      /* attempts to be < 0  */
     }
```

```
    if ((no_of_bits >= 0) && (no_of_bits < 204.75))
      {
      clear_bit(P3_1_bit);                          /* Send out a nominal */
      set_bit(P3_0_bit);                            /* gain of one if     */
      output(P1,0xC7);                              /* 0 <= gain < .45    */
      }
    if ((no_of_bits >= 204.75) && (no_of_bits < 256))
      {
      clear_bit(P3_1_bit);                          /*      Signals for    */
      clear_bit(P3_0_bit);                          /* .45 <= gain < 0.56  */
      output(P1,no_of_bits);
      }
    if ((no_of_bits >= 256) && (no_of_bits < 512))
      {
      no_of_bits = no_of_bits - 256;                /*      Signals for    */
      clear_bit(P3_1_bit);                          /* .56 <= gain < 1.123 */
      set_bit(P3_0_bit);
      output(P1,no_of_bits);
      no_of_bits = no_of_bits + 256;
      }
    if ((no_of_bits >= 512) && (no_of_bits < 768))
      {
      no_of_bits = no_of_bits - 512;                /*      Signals for     */
      set_bit(P3_1_bit);                            /* 1.123<=gain < 1.686  */
      clear_bit(P3_0_bit);
      output(P1,no_of_bits);
      no_of_bits = no_of_bits + 512;
      }
    if ((no_of_bits >= 768) && (no_of_bits < 1024))
      {
      no_of_bits = no_of_bits - 768;                /*      Signals for     */
      set_bit(P3_1_bit);                            /* 1.688<=gain < 2.248  */
      set_bit(P3_0_bit);
      output(P1,no_of_bits);
      no_of_bits = no_of_bits + 768;
      }
    if (no_of_bits >= 1024)
      {
      clear_bit(P3_1_bit);                          /* Send out a nominal   */
      set_bit(P3_0_bit);                            /* gain of one if gain  */
      output(P1,0xC7);                              /* tries to be > 2.248  */
      }
  }

/**********************************************************************/
/* This subroutine performs the calculations that must be done once a data */
/* set has been stored in the finebins[256] array.  This is really the     */
/* main non-speed-critical part of the program, since main() calls only    */
/* high-speed assembly code.  It does the following tasks:                 */
/*          1) resets the variable buzzer to zero                          */
/*          2) turns off the timer                                         */
/*          3) converts finebins data to coarsebins data                   */
/*          4) resets the variable no_of_counts to zero                    */
/*          5) resets the variable alarm_count to zero                     */
/*          6) sorts for and tests the coarse peak, maybe fine peak        */
/*          7) converts fine or coarse gain value to 10-bit binary         */
```

A11

```
/*                8) sends the gain signal to the DAC                       */
/*                9) zeros the finebins and coarsebins arrays               */
/*               10) turns the timer back on, and takes more data           */
/* As this subroutine is entered, the "counting indicator" LED will be      */
/* turned off, and will remain off until calculations are complete, and a   */
/* gain value is sent.  When this subroutine is exited, and code execution  */
/* returns to ReadCount(), the "counting indicator" LED will be turned on.  */
/****************************************************************************/
void calculate()
   {
   buzzer = 0;                        /* Reset clock count                  */
   clear_bit(P3_3_bit);               /* Turn off blue "Counting..." LED    */
   clear_bit(TR1_bit);                /* Stop the timer while calculating   */
   coarse_bin_conversion();           /* Clump finebins into coarsebins     */
   no_of_counts = 0;                  /* reset no_of_counts to zero         */
   alarm_count = 0;                   /* reset alarm_count to zero          */
   max_coarsebin_sortntest();         /* sort coarsebins to find the max    */
   gain_conversion();                 /* convert float to 10-bit binary     */
   ZeroCount();                       /* Math's done: clear array RAM       */
   set_bit(P3_3_bit);                 /* Turn on blue "Counting..." LED     */
   set_bit(TR1_bit);                  /* Start the timer                    */
   }

/****************************************************************************/
/*                                                                          */
/*                              Main Loop                                   */
/*                                                                          */
/****************************************************************************/
void main()                           /* Start the routine                  */
   {
   clear_bit(P3_5_bit);               /* Green LED on at power up - init started */
   set_bit(P3_3_bit);                 /* Latch should be "deaf" until we're ready */
   clear_bit(P3_4_bit);               /* Send an initial EOC signal         */
   set_bit(P3_4_bit);                 /*                                    */
   default_gain();                    /* Send out default gain value if necessary */
   init_timer();                      /* Configure the timer                */
   ZeroCount();                       /* Clear RAM used by arrays           */
   Internalize();                     /* Set up internal variables under stack */
   set_bit(EA_bit);                   /* Make processor acknowledge interrupts. */
   set_bit(TR1_bit);                  /* Start the timer                    */ while (1)
      {
     ReadCount();                     /* Go to RANCOUNT assembly code - get data */
      }
   }
```

```
;*********************************************************************
;* RANCOUNT.S03                                 Design:    8031      *
;* BY TIM RICE                                             32K EPROM *
;*                                                         32K RAM   *
;* TO BE USED WITH PROJECT E-619-0096                      ADC0820   *
;* GAIN STABILIZATION CONTROLLER FOR NUCLEAR DENSOMETER              *
;*       Last modified by Tim Rice 11/03/92     10:30 a.m.           *
;*       This version gives a shot at doing ADC inputs by means of   *
;*       a constant polling method, rather than by interrupts.       *
;*********************************************************************
        NAME RANCOUNT EXTERN  finebins         ; Unsigned int [256] array set up in C code
        EXTERN  coarsebins       ; Unsigned long [51] array set up in C code
        EXTERN  no_of_counts     ; Unsigned long
        EXTERN  alarm_count      ; Unsigned int
        EXTERN  calculate        ; C subroutine which finds gain, etc.

PUBLIC  INT_ALARM_COUNT
        PUBLIC  ZeroCount        ; Assembly routine to zero fine/coarse arrays
        PUBLIC  ReadCount        ; Assembly loop which reads/stores ADC data
        PUBLIC  Internalize      ; Assembly code to shove no_of_counts and
                                 ; alarm_count under stack in internal mem

RSEG CODE

INT_ALARM_COUNT     DEFINE     08H    ; Used by Internalize
;*********************************************************************
;* INTERNALIZE:                                                      *
;* Put alarm_count at internal memory location 0008-0009 (INT_ALARM_COUNT). *
;* This is done to avoid time-costly MOVX instructions later when the loop  *
;* is being executed.  It saves 4-10 us, which is significant.  This code   *
;* is called from gain.c's Internalize();                                   *
;*********************************************************************
Internalize:
        MOV     DPTR,#alarm_count
        MOVX    A,@DPTR
        MOV     INT_ALARM_COUNT,A
        INC     DPTR
        MOVX    A,@DPTR
        MOV     INT_ALARM_COUNT + 1,A

RET

;*********************************************************************
;* ZEROCOUNT:                                                        *
;* Here zeros are written to all finebins[] and coarsebins[] array cells to *
;* make certain no stray data floats around out there.  Two labels, ZCLOOP1 *
;* and ZCLOOP2, are used:  The first does the finebins array, the second    *
;* does the coarsebins array.  This is called from gain.c's ZeroCount();    *
;* The finebins array resides from 000E-020E, coarsebins at 0210-02D8.      *
;*********************************************************************
```

```
ZeroCount:
        MOV     DPTR,#finebins          ; Point to external memory
        CLR     A                       ; Set loop counter
        XCH     A,R0
        CLR     A                       ; Set initial value (0)
ZCLOOP1:
        MOVX    @DPTR,A                 ; Move two bytes per integer
        INC     DPTR
        MOVX    @DPTR,A
        INC     DPTR
        DJNZ    R0,ZCLOOP1              ; Loop till done MOV     DPTR,#coarsebins        ; Point to external memory
        MOV     A,#51                   ; Set loop counter
        XCH     A,R0
        CLR     A                       ; Set value to 0 to clear cells
ZCLOOP2:
        MOVX    @DPTR,A                 ; Move four bytes per unsigned long
        INC     DPTR
        MOVX    @DPTR,A                 ; Second byte
        INC     DPTR
        MOVX    @DPTR,A                 ; Third byte
        INC     DPTR
        MOVX    @DPTR,A                 ; Fourth byte
        INC     DPTR
        DJNZ    R0,ZCLOOP2              ; Check loop counter

RET

;*********************************************************************
;* READCOUNT:                                                        *
;* This is the time-critical loop which reads the data from the ADC. The *
;* list below shows the chronological order of events with execution times: *
;*      Initialize carry bit and accumulator              2 us       *
;*      Wait for valid pulse ready signal           > or = 2 us       *
;*      Send dummy write to ADC                           5 us       *
;*      Read ADC data in and increment a finebin cell    33 us       *
;*      Reset P.D. & H.                                   2 us       *
;*      Loop back into ReadCount:                         2 us       *
;*                  minimum total loop time at 12 Mhz  -> 46 us       *
;* This code is called from gain.c's main().                         *
;*********************************************************************
ReadCount:
        CLR     C                       ; Initialize carry bit and ACC
        CLR     A                       ; for the first time through...
        XCH     A,R0                    ; Save as high byte
LABEL1  JNB     P3.2,LABEL1             ; Stay right here until a valid pulse
                                        ; is ready (a high signal hits P3.2)
        RLC     A                       ; Multiply by 2 for two byte int
        XCH     A,R0                    ; Including the high byte
        RLC     A                       ; place msb from MOVX into lsb of ACC
        XCH     A,R0                    ; restore lsb into A and msb into R0
        ADD     A,#LOW(finebins)        ; Add to base address of array
        MOV     DPL,A                   ; And point to external memory
```

A14

```
XCH     A,R0
ADDC    A,#HIGH(finebins)
MOV     DPH,A
MOV     R2,DPH              ; Save the current data pointer
MOV     R3,DPL
INC     DPTR                ; Increment it to point at LSB's address
MOVX    A,@DPTR             ; Get the LSB value at that address
ADD     A,#1                ; Add one to the LSB
MOVX    @DPTR,A             ; Move the new value back out there
MOV     DPH,R2              ; Retrieve the old (MSB part) data
MOV     DPL,R3              ;     pointer that was saved earlier
MOVX    A,@DPTR             ; Get the MSB value at that address
ADDC    A,#0                ; Add zero and the carry to the MSB
MOVX    @DPTR,A             ; Move the new value back out there
                            ; All this has to be done because
                            ;    the 8051 stores LSB first, and
                            ;    has no DEC DPTR instruction!

CLR     A                   ; Clear accumulator
XCH     A,R0                ; Save as high byte
MOV     DPTR,#8000H         ; Address the counter (or latch)
MOVX    A,@DPTR             ; Put counter value in accumulator
                            ; This is the "real" read...
                            ; ----------------------------------
                            ; ADD    A,#1
                            ; Add one to put data in right bin
                            ; (due to difference between physical
                            ; bin # and array bin #.)
                            ; This line added 7/13/90.
                            ; This line removed 11/3/92.
                            ; ----------------------------------
CLR     C                   ; Clear carry bit.  This was moved
                            ; from in front of the CLR A command
                            ; to here because a count in 255 was
                            ; registering in the first bin as 256.
CLR     P3.4                ; EOC signal is high-to-low transition
SETB    P3.4                ; --------------,_,-----------------
SJMP    LABEL1

END
```

```
;*********************************************************************
;* CSTARTUP.S03                                                       *
;*         Modified for Gain Stabilization Controller  E-619-0096     *
;*         Last Modified at  2:30 p.m. 07/25/90                       *
;*         By Tim Rice                                                *
;*********************************************************************
;*********************************************************************
;* This version implements a constant polling method to maximize speed *
;*********************************************************************
        NAME    CSTARTUP
$DEFMM.INC                              ; select expanded chip model PUBLIC  exit
        PUBLIC  READMORE
        EXTERN  main
        EXTERN  _R                      ; Register Bank.  Takes care of itself.
        EXTERN  ReadCount               ; Interrupt from incoming PRTC signal.
        EXTERN  INT_ALARM_COUNT
        EXTERN  alarm_count
        EXTERN  calculate
        EXTERN  count_time
        EXTERN  buzzer
;*********************************************************************
;* Take care of the stack requirements--the variables alarm_count and  *
;* no_of_counts are stored in internal memory just under the stack, which *
;* begins at 10H.  See RANCOUNT.S03 and LNK8051.XCL                    *
;*********************************************************************
        RSEG    XSTACK
        DS      2048                    ; change if necessary
xstack_end:
        RSEG    ISTACK
stack_begin:
        DS      57                      ; Enough room for interrupts.
        RSEG    CSTART                  ; Should be at location zero
startup:
        SJMP    init ;*********************************************************************
;* Interrupt vectors are defined here.                                 *
;*********************************************************************
        ORG     startup + 1Bh
        LJMP    timer1hndlr ORG     startup+30h
init:   MOV     A,#_R
        MOV     C,ACC.3
        MOV     PSW.3,C
        MOV     C,ACC.4
        MOV     PSW.4,C
        MOV     SP,#stack_begin         ; From low to high addresses
        EXTERN  ?SEG_INIT_L17
        LCALL   ?SEG_INIT_L17           ; Initialize segments
        MOV     R6,#HIGH(xstack_end)
        MOV     R7,#LOW(xstack_end)
        LCALL   main                    ; main()
exit:   LJMP    startup
```

A16

```
timer1hndlr:                                    ; saves some regs., calls C routine
        PUSH    ACC
        PUSH    PSW
        PUSH    DPH
        PUSH    DPL
        PUSH    _R+0
        PUSH    _R+1
        CLR     TCON.6                          ; turn timer 1 off
        MOV     141,#82                         ; reload timer with starting count
        MOV     139,#100                        ; Hex = 5264.  52 = 82, 64 = 100.
        SETB    TCON.6                          ; turn timer 1 back on
        MOV     A,#1
        ADD     A,INT_ALARM_COUNT + 1           ; increment LSB of alarm_count
        XCH     A,INT_ALARM_COUNT + 1
        ADD     A,#1                            ; increment alarm_count for C now.
        MOV     DPL,#01H
        MOV     DPH,#00H
        MOVX    @DPTR,A
        MOV     R1,A
        CJNE    R1,#20,READMORE                 ; Compare alarm_count with 20
                                                ; If < 20, read more data.  If
                                                ; = 20, check buzzer, count_time
        MOV     DPL,#LOW(buzzer)
        MOV     DPH,#HIGH(buzzer)               ; Get the LSB of buzzer
        INC     DPTR
        MOVX    A,@DPTR
        INC     A
        MOVX    @DPTR,A
        XCH     A,R0                            ; Put buzzer in R0
        MOV     DPL,#LOW(count_time)
        MOV     DPH,#HIGH(count_time)           ; Get the LSB of count_time
        INC     DPTR
        MOVX    A,@DPTR                         ; Put count_time in A
        SUBB    A,R0                            ; See if they match
        JNZ     clralmcnt
        MOV     DPH,#00H                        ; Be careful not to mess
        MOV     DPL,#00H                        ; parameters as we go to C!
        LCALL   calculate
clralmcnt:
        MOV     DPL,#01H
        MOV     DPH,#00H
        MOV     A,#0
        MOVX    @DPTR,A
        MOV     0008H,#0                        ; The value of alarm_count that
        MOV     0009H,#0                        ; resides under the stack has to
                                                ; be reset, too.
READMORE:
        POP     _R+1
        POP     _R+0
        POP     DPL                             ; Put the stack back
        POP     DPH
        POP     PSW
        POP     ACC
        RETI
        END     startup
```

A17

What is claimed is:

1. A method of stabilizing the output of a radiation detection instrument to provide consistent energy spectra with a predetermined peak at a predetermined energy level within the spectra, said method comprising:

collecting an energy spectrum using the radiation detection instrument;

testing the collected spectrum against a predetermined rule set to determine automatically both where the predetermined peak is in the collected spectrum and whether the located predetermined peak is at the predetermined energy level in the collected spectrum; and adjusting the output of the radiation detection instrument, in response to testing the collected spectrum, so that the predetermined peak of at least a subsequently collected spectrum is at the predetermined energy level within the subsequently collected spectrum.

2. A method as defined in claim 1, wherein testing the collected spectrum includes using automated digital means.

3. A method as defined in claim 1, wherein:

the predetermined rule set is encoded in a computer;

collecting an energy spectrum includes encoding the collected spectrum into the computer; and testing the collected spectrum includes performing with the computer calculations of comparisons in response to the encoded rule set and the encoded spectrum.

4. A method as defined in claim 1, wherein the predetermined peak is a photoelectric peak.

5. A method as defined in claim 1, wherein the rule set includes a plurality of criteria collectively distinguishing the predetermined peak from other peaks in the generated spectrum, and further wherein:

collecting the spectrum includes:

detecting energy responsive to radiation interaction events;

collecting electric pulses responsive to detected energies; and encoding the electric pulses so that portions of the collected spectrum can be analyzed; and testing the collected spectrum includes:

analyzing portions of the encoded spectrum relative to a first criterion of the rule set until at least one of the portions satisfies the first criterion;

analyzing the at least one portion satisfying the first criterion relative to a second criterion of the rule set;

performing the steps of analyzing relative to the first and second criteria to determine one portion of the encoded spectrum that satisfies both the first and second criteria and thereby to determine the one portion that contains the predetermined peak; and analyzing the one portion relative to at least a third criterion to determine whether the predetermined peak is at the predetermined energy level.

6. A method as defined in claim 5, wherein the first criterion distinguishes relative maxima within the encoded spectrum and the second criterion distinguishes relative positioning of a maximum within the encoded spectrum.

7. A method as defined in claim 6, wherein the third criterion distinguishes whether the predetermined peak is inside or outside a predetermined range of the predetermined energy level of the encoded spectrum.

8. A method as defined in claim 7, wherein adjusting the output of the radiation detection instrument includes providing a coarse gain adjustment in response to distinguishing that the predetermined peak is outside the predetermined range of the predetermined energy level and providing a fine gain adjustment in response to distinguishing that the predetermined peak is inside the predetermined range of the predetermined energy level.

9. A method as defined in claim 5, wherein:

encoding the electric pulses includes generating for a respective energy level within the collected spectrum a digital count of the number of electric pulses encoded as representing the respective energy level;

analyzing portions of the encoded spectrum relative to a first criterion includes determining whether a total of the counts for a group of energy levels within the encoded spectrum is within a predetermined percentage range relative to a total of counts within the encoded spectrum; and analyzing the at least one portion satisfying the first criterion relative to a second criterion includes determining whether the total count for a group of energy levels having its total count within the predetermined percentage range has a predetermined magnitude relative to the total counts for selected other groups of energy levels.

10. A method as defined in claim 9, wherein analyzing the one portion relative to at least a third criterion includes determining whether a group of energy levels having its total count within the predetermined percentage range and at a predetermined magnitude relative to the total counts for selected other groups of energy levels includes the predetermined energy level.

11. A method as defined in claim 10, wherein adjusting the output of the radiation detection instrument includes:

in response to determining that the group of energy levels having its total count within the predetermined percentage range and at a predetermined magnitude relative to the total counts for selected other groups of energy levels does not include the predetermined energy level, providing a coarse gain adjustment; and in response to determining that the group of energy levels having its total count within the predetermined percentage range and at a predetermined magnitude relative to the total counts for selected other groups of energy levels does include the predetermined energy level, providing a fine gain adjustment.

12. A method as defined in claim 1, further comprising supplying a status signal through a readout of the radiation detection instrument.

13. A method as defined in claim 12, wherein supplying a status signal includes communicating to the readout a signal having a predetermined frequency and displaying at the readout a status message in response to the predetermined frequency of the signal.

14. A method as defined in claim 1, wherein:

collecting the spectrum includes:

detecting energy responsive to radiation interaction events;

collecting electric pulses responsive to detected energies; and generating for a respective energy level within the collected spectrum a digital count of the number of electric pulses encoded as representing the respective energy level; and said method further comprises comparing a total of the digital counts for the collected spectrum with preset upper and lower count limits to determine if a valid spectrum has been obtained.

15. A method as defined in claim 14, further comprising communicating a signal having a predetermined frequency designating an invalid spectrum condition in response to the total of the digital counts being outside the preset upper and lower count limits and displaying an error status message in response to the predetermined frequency of the signal.

16. An apparatus for stabilizing the output of a radiation detection instrument which includes a radiation detector assembly, said apparatus comprising: a variable gain amplifier for receiving output from the radiation detector assembly; and a programmed digital computer for receiving input responsive to output from the radiation detector assembly and for providing adjustment control to said variable gain amplifier, said programmed computer including:

means for defining storage bins in said computer;

means for defining one of the storage bins as a predetermined bin where data representing a predetermined radiation interaction event energy sensed by the radiation detector assembly should be stored;

means for collecting respective data in response to output from the radiation detector assembly and for storing the collected data in respective bins;

means for analyzing selected groups of bins for determining which group of bins includes a bin containing data representing the predetermined radiation interaction event energy and for determining whether said determined group includes the predetermined bin;

means for generating a course adjustment signal for controlling said variable gain amplifier in response to said means for analyzing determining said determined group does not include the predetermined bin; and means for generating a fine adjustment signal for controlling said variable gain amplifier in response to said means for analyzing determining said determined group does include the predetermined bin.

17. An apparatus as defined in claim 16, wherein said means for analyzing includes:

means for performing a first test using the stored data in bins within selected groups of bins, wherein a selected group of bins passing the first test is a candidate group;

means for performing a second test using the stored data in bins within a second candidate group, wherein a said candidate group passing the second test is a correct candidate group; and means for performing a third test using the stored data in bins within said correct candidate group.

18. An apparatus as defined in claim 17, wherein said data includes digital counts responsive to respective radiation interaction event energies sensed by the radiation detector assembly.

19. A method of stabilizing the output of a radiation detection instrument to provide output electric pulses consistently representing respective radiation energies deposited in a detector of the instrument for respective individual radiation interaction events, said method comprising:

(a) automatically determining which of a sample of the output electric pulses are to represent a predetermined radiation energy and determining whether these output electric pulses actually designate the predetermined radiation energy; and (b) automatically adjusting the output of the radiation detection instrument in response to determining that the sampled output electric pulses that are to represent the predetermined radiation energy do not designate the predetermined radiation energy;

wherein step (a) includes:

(a1) converting respective sampled electric pulses to respective counts;

(a2) generating respective digital counts of the numbers of counts from step (a1) having the same values and storing each digital count as a respective identifiable bin in a computer memory;

(a3) determining whether the predetermined radiation energy could be represented by a digital count within a selected group of the bins, including computing a sum of the digital counts in the selected group of bins and computing a sum of the digital counts for a plurality of groups of the bins; and (a4) for a selected group of bins determined in step (a3) to be a candidate group by including a digital count that could represent the predetermined radiation energy, determining whether the candidate group actually includes the digital count that represents the predetermined radiation energy, including comparing a sum of the digital counts from the bins in the candidate group to a sum of the digital counts from the bins in another selected group of bins.

20. A method as defined in claim 19, wherein step (a) further includes, for a candidate group determined in step (a4) to be the correct candidate group by including the digital count that represents the predetermined radiation energy, determining whether the correct candidate group includes as one of its bins a bin that has been predetermined as the proper bin for containing the digital count representing the predetermined radiation energy.

21. A method as defined in claim 20, wherein step (b) includes:

in response to determining that the correct candidate group does not include the bin predetermined as the proper bin, generating a coarse adjustment signal and communicating the coarse adjustment signal to a variable gain amplifier receiving the output of a radiation detector assembly of the radiation detection instrument; and in response to determining that the correct candidate group does include the bin predetermined as the proper bin, determining a centroid in response to the digital counts in the bins of the correct candidate group, generating a fine adjustment signal in response to the centroid and communicating the fine adjustment signal to the variable gain amplifier.

22. A method of automatically stabilizing the output of a radiation detection instrument continually throughout actual use of the instrument, to provide output electric pulses consistently representing respective radiation energies deposited in a detector of the instrument for respective individual radiation interaction events, said method comprising:

(a) automatically determining which of a sample of the output electric pulses are to represent a predetermined radiation energy and automatically determining whether these output electric pulses actually designate the predetermined radiation energy;

(b) automatically adjusting the output of the radiation detection instrument in response to determining that the sampled output electric pulses that are to represent the predetermined radiation energy do not designate the predetermined radiation energy regardless of the offset between the radiation energy represented by said output electric pulses and the predetermined radiation energy; and (c) automatically repeating said steps (a) and (b) throughout actual use of the radiation detection instrument.

* * * * *